(12) United States Patent
Baek et al.

(10) Patent No.: US 7,619,807 B2
(45) Date of Patent: *Nov. 17, 2009

(54) MICROMIRROR ARRAY LENS WITH OPTICAL SURFACE PROFILES

(75) Inventors: Sang Hyune Baek, Suwon (KR); Jin Young Sohn, Fullerton, CA (US); Gyoung Il Cho, Seoul (KR); Cheong Soo Seo, Seongnam (KR)

(73) Assignees: Angstrom, Inc., Seongnam (KR); Stereo Display, Inc., Anaheim, CA (US)

( * ) Notice: Subject to any disclaimer, the term of this patent is extended or adjusted under 35 U.S.C. 154(b) by 40 days.

This patent is subject to a terminal disclaimer.

(21) Appl. No.: 11/933,105

(22) Filed: Oct. 31, 2007

(65) Prior Publication Data

US 2008/0049291 A1  Feb. 28, 2008

Related U.S. Application Data

(63) Continuation-in-part of application No. 10/983,353, filed on Nov. 8, 2004, now Pat. No. 7,267,447, and a continuation-in-part of application No. 11/191,886, filed on Jul. 28, 2005, now Pat. No. 7,095,548, and a continuation-in-part of application No. 11/426,565, filed on Jun. 26, 2006, and a continuation-in-part of application No. 11/743,664, filed on May 2, 2007, now Pat. No. 7,489,434.

(51) Int. Cl.
*G02B 26/00* (2006.01)
*G02B 17/00* (2006.01)
*G02B 5/08* (2006.01)

(52) U.S. Cl. .................. 359/290; 359/726; 359/846

(58) Field of Classification Search ................. 359/290, 359/291, 726, 727, 846
See application file for complete search history.

(56) References Cited

U.S. PATENT DOCUMENTS

| | | | |
|---|---|---|---|
| 2,002,376 A | 5/1935 | Mannheimer |
| 4,407,567 A | 10/1983 | Michelet |
| 4,834,512 A | 5/1989 | Austin |
| 4,853,787 A | 8/1989 | Kurth |
| 4,944,580 A | 7/1990 | MacDonald |
| 5,004,319 A | 4/1991 | Smither |
| 5,172,235 A | 12/1992 | Wilm |

(Continued)

FOREIGN PATENT DOCUMENTS

| | | |
|---|---|---|
| JP | 08-043881 | 2/1996 |
| JP | 11-069209 | 3/1999 |
| JP | 2002-288873 | 10/2002 |

*Primary Examiner*—William C Choi

(57) ABSTRACT

A Micromirror Array Lens comprises a plurality of micromirrors arranged on a flat or a curved surface to reflect incident light. Each micromirror in the Micromirror Array Lens is configured to have at least one motion. The Micromirror Array Lens forms at least one optical surface profile reproducing free surfaces by using the motions of the micromirrors. The free surface can be any two or three-dimensional continuous or discrete reflective surface. The Micromirror Array Lens having the corresponding optical surface profile provides optical focusing properties substantially identical to those of the free surface. The Micromirror Array Lens can forms various optical elements such as a variable focal length lens, a fixed focal length lens, an array of optical switches, a beam steerer, a zone plate, a shutter, an iris, a multiple focal length lens, other multi-function optical elements, and so on.

49 Claims, 28 Drawing Sheets

U.S. PATENT DOCUMENTS

| | | | |
|---|---|---|---|
| 5,212,555 | A | 5/1993 | Stoltz |
| 5,369,433 | A | 11/1994 | Baldwin |
| 5,402,407 | A | 3/1995 | Eguchi |
| 5,467,121 | A | 11/1995 | Allcock |
| 5,612,736 | A | 3/1997 | Vogeley |
| 5,661,518 | A | 8/1997 | Palm |
| 5,696,619 | A | 12/1997 | Knipe |
| 5,748,199 | A | 5/1998 | Palm |
| 5,881,034 | A | 3/1999 | Mano |
| 5,897,195 | A | 4/1999 | Choate |
| 5,986,811 | A | 11/1999 | Wohlstadter |
| 6,025,951 | A | 2/2000 | Swart |
| 6,028,689 | A | 2/2000 | Michalicek |
| 6,064,423 | A | 5/2000 | Geng |
| 6,084,843 | A | 7/2000 | Abe |
| 6,104,425 | A | 8/2000 | Kanno |
| 6,111,900 | A | 8/2000 | Suzudo |
| 6,123,985 | A | 9/2000 | Robinson |
| 6,233,087 | B1 | 5/2001 | Hawkins |
| 6,282,213 | B1 | 8/2001 | Gutin |
| 6,304,263 | B1 | 10/2001 | Chiabrera |
| 6,315,423 | B1 | 11/2001 | Yu |
| 6,329,737 | B1 | 12/2001 | Jerman |
| 6,329,963 | B1 | 12/2001 | Chiabrera |
| 6,421,081 | B1 | 7/2002 | Markus |
| 6,438,272 | B1 | 8/2002 | Huang |
| 6,498,673 | B1 | 12/2002 | Frigo |
| 6,507,366 | B1 | 1/2003 | Lee |
| 6,549,730 | B1 | 4/2003 | Hamada |
| 6,600,591 | B2 | 7/2003 | Anderson |
| 6,611,343 | B1 | 8/2003 | Frankowski |
| 6,618,209 | B2 | 9/2003 | Nishioka |
| 6,625,342 | B2 | 9/2003 | Staple |
| 6,649,852 | B2 | 11/2003 | Chason |
| 6,650,461 | B2 | 11/2003 | Atobe |
| 6,658,208 | B2 | 12/2003 | Watanabe |
| 6,711,319 | B2 | 3/2004 | Hoen |
| 6,741,384 | B1 | 5/2004 | Martin |
| 6,781,731 | B2 | 8/2004 | Choi |
| 6,781,732 | B2 | 8/2004 | Cho |
| 6,784,771 | B1 | 8/2004 | Fan |
| 6,801,260 | B1 | 10/2004 | Veksland |
| 6,804,429 | B2 | 10/2004 | Yu |
| 6,833,938 | B2 | 12/2004 | Nishioka |
| 6,836,459 | B2 | 12/2004 | Komoto |
| 6,870,660 | B2 | 3/2005 | DiCarlo |
| 6,885,819 | B2 | 4/2005 | Shinohara |
| 6,900,901 | B2 | 5/2005 | Harada |
| 6,900,922 | B2 | 5/2005 | Aubuchon |
| 6,906,848 | B2 | 6/2005 | Aubuchon |
| 6,906,849 | B1 | 6/2005 | Mi |
| 6,909,453 | B2 | 6/2005 | Mochizuki |
| 6,914,712 | B2 | 7/2005 | Kurosawa |
| 6,919,982 | B2 | 7/2005 | Nimura |
| 6,934,072 | B1 | 8/2005 | Kim |
| 6,934,073 | B1 | 8/2005 | Kim |
| 6,943,950 | B2 | 9/2005 | Lee |
| 6,944,103 | B2 | 9/2005 | Hong |
| 6,956,687 | B2 | 10/2005 | Moon |
| 6,958,777 | B1 | 10/2005 | Pine |
| 6,970,284 | B1 | 11/2005 | Kim |
| 6,971,116 | B2 | 11/2005 | Takeda |
| 6,985,299 | B2 | 1/2006 | Bakin |
| 6,995,897 | B2 | 2/2006 | Mushika |
| 6,995,909 | B1 | 2/2006 | Hayashi |
| 6,999,226 | B2 | 2/2006 | Kim |
| 7,009,561 | B2 | 3/2006 | Menache |
| 7,019,376 | B2 | 3/2006 | Patel |
| 7,023,466 | B2 | 4/2006 | Favalora |
| 7,025,461 | B2 | 4/2006 | Veligdan |
| 7,027,207 | B2 | 4/2006 | Huibers |
| 7,031,046 | B2 | 4/2006 | Kim |
| 7,046,447 | B2 | 5/2006 | Raber |
| 7,057,826 | B2 | 6/2006 | Cho |
| 7,068,415 | B2 | 6/2006 | Mushika |
| 7,068,416 | B2 | 6/2006 | Gim |
| 7,077,523 | B2 | 7/2006 | Seo |
| 7,079,325 | B2 | 7/2006 | Konno |
| 7,088,493 | B2 | 8/2006 | Alain |
| 7,091,057 | B2 | 8/2006 | Gan |
| 7,127,136 | B2 | 10/2006 | Hall |
| 7,161,729 | B2 | 1/2007 | Kim |
| 7,164,465 | B2 | 1/2007 | Klosner |
| 7,173,653 | B2 | 2/2007 | Gim |
| 7,184,192 | B2 | 2/2007 | Sandstrom |
| 7,195,163 | B2 | 3/2007 | Yoo |
| 7,209,286 | B2 | 4/2007 | Mann |
| 7,212,330 | B2 | 5/2007 | Seo |
| 7,215,882 | B2 | 5/2007 | Cho |
| 7,239,438 | B2 | 7/2007 | Cho |
| 7,245,325 | B2 | 7/2007 | Yamaguchi |
| 7,245,363 | B2 | 7/2007 | Mushika |
| 7,261,417 | B2 | 8/2007 | Cho |
| 7,267,447 | B2 | 9/2007 | Kim |
| 7,274,517 | B2 | 9/2007 | Cho |
| 7,306,344 | B2 | 12/2007 | Abu-Ageel |
| 7,315,503 | B2 | 1/2008 | Cho |
| 7,333,260 | B2 | 2/2008 | Cho |
| 7,339,746 | B2 | 3/2008 | Kim |
| 7,354,167 | B2 | 4/2008 | Cho |
| 7,355,627 | B2 | 4/2008 | Yamazaki |
| 7,370,412 | B2 | 5/2008 | Hiraoka |
| 2003/0174234 | A1 | 9/2003 | Kondo |
| 2004/0021802 | A1 | 2/2004 | Yoshino |
| 2004/0184146 | A1 | 9/2004 | Uehara |
| 2004/0207768 | A1 | 10/2004 | Liu |
| 2005/0206773 | A1 | 9/2005 | Kim |
| 2005/0207486 | A1 | 9/2005 | Lee |
| 2005/0212856 | A1 | 9/2005 | Temple |
| 2005/0259158 | A1 | 11/2005 | Jacob |
| 2006/0007301 | A1 | 1/2006 | Cho |
| 2006/0120706 | A1 | 6/2006 | Cho |
| 2006/0146140 | A1 | 7/2006 | Kennedy |
| 2006/0209439 | A1 | 9/2006 | Cho |
| 2006/0256332 | A1 | 11/2006 | Sandstrom |
| 2007/0263113 | A1 | 11/2007 | Baek |

MICROMIRROR ARRAY LENS WITH OPTICAL SURFACE PROFILES

REFERENCE TO RELATED APPLICATION

This application is a continuation-in-part of, and claims priority to U.S. patent application Ser. No. 10/983,353 filed Nov. 8, 2004, U.S. patent application Ser. No. 11/191,886 filed Jul. 28, 2005, U.S. patent application Ser. No. 11/426,565 filed Jun. 26, 2006, U.S. patent application Ser. No. 11/743,664 filed May 2, 2007, all of which are hereby incorporated by reference.

FIELD OF INVENTION

The present invention relates to a Micromirror Array Lens device comprising micromirrors forming various optical elements.

BACKGROUND OF INVENTION

Majority of conventional lenses are spherical because spherical lenses are easy to manufacture and production cost is low. However, the spherical lenses cannot make parallel rays converge into one point due to aberration. The aberration caused by spherical lenses increases as the aperture size of the spherical lenses increases. Thus, multiple lenses have to be combined to correct the problems. Since many lenses are assembled, there are limitations in achieving high performance especially for a large-aperture lens system. The large aperture lens system using spherical lens requires multiple additional large aperture lenses to correct aberration, which make the lens system bulky and impossible to use in compact portable systems. Alternatively, a single lens can be fabricated to have an aspherical surface in order to make incident light converge into one point or satisfy selected focusing property requirements. The aspherical lens can reduce volume and weight of an optical system and provide high optical performance. For this reason, aspherical lenses have been demanded for beam projector, projection TV, CD-ROM pickup, DVD player, laser printer, laser scanning unit, etc. However, conventional aspherical lenses involve with a complicated time-consuming fabrication process with high cost and have difficulty in achieving actually required lens specification.

Fresnel type lenses are a good solution for making large lenses without handling large and heavy materials. However, the quality of the conventional Fresnel lenses is not as good as the conventional spherical lens. The conventional Fresnel lenses offer only procedure reducing thickness.

Gradient index lenses can be another choice for reducing the volume of a lens system. The gradient index lens uses a flat surface material with a gradually varying refractive index and functions as a conventional refractive lens. Using the gradient index of material and geometrical variation together, the aberration of the lens system can be reduced. Although the gradient index lens gives significant reduction in the aberration and volume, it is still expensive and difficult to fabricate.

Many optical systems require a lens or a lens system having variable optical properties including a variable focal length and/or a variable optical axis. A most widely used conventional variable focal length lens system is the one using two refractive lenses. It has complex driving mechanisms to control the relative positions of refractive lenses and a slow response time. Regarding the variable optical axis, most conventional optical systems use attitude control systems with a macroscopic servo mechanism in order to provide the variable optical axis. These attitude control systems tend to be slow, bulky, and expensive to operate.

Other lenses have been made of electrically variable refractive index media to create either a conventional lens or a gradient index lens by means of a voltage gradient. The electrically variable refractive index allows the focal length of the lenses to be voltage controlled. Among them, the most advanced variable focal length lens is a liquid crystal variable focal length lens, which has a complex mechanism to control the focal length. Its focal length is changed by modulating the refractive index. Unfortunately, it has a slow response time typically on the order of hundreds of milliseconds. Even though the fastest response liquid crystal lens has the response time of tens of milliseconds, it has small focal length variation and low focusing efficiency.

MEMS devices using micromirrors can provide many demanding features of lens systems such as reduced volume, easy and mass production, and fast response time. In the prior art of micromirror array like Digital Micromirror Device (DMD), the micromirrors are arranged in the flat surface and actuated by digital control of a voltage. In addition to satisfying the demanding feature of lens systems, the DMD has large rotations of the micromirrors, a low driving voltage, and compatibility with known semiconductor electronics technologies. However, it has only single DOF (Degree Of Freedom); rotation about an axis with two level positions. So, the DMD is merely the array of optical switches rather than a lens.

The Micromirror Array Lens of the present invention works as various types of lenses with variable optical properties in addition to the advantages of the DMD devices by using a plurality of the micromirror motions.

SUMMARY OF INVENTION

The present invention contrives to solve the disadvantages of the conventional lens and improves the design and control of the Micromirror Array Lens. Also, the invention extends advantages and applications of the Micromirror Array Lens.

In one embodiment of the present invention, a Micromirror Array Lens comprises a plurality of micromirrors arranged on a flat or a curved surface to reflect incident light. The micromirrors in the Micromirror Array Lens have reflective surfaces and are configured to have at least one motion. The Micromirror Array Lens has at least one optical surface profile reproducing at least one free surface by using the motions of the micromirrors. The free surface can be any two or three-dimensional continuous or discrete reflective surface. The optical surface profile is determined by rotation and translation of the micromirrors in the Micromirror Array Lens. The Micromirror Array Lens having the corresponding optical surface profile provides optical focusing properties substantially identical to those of the free surface. Each optical surface profile simulates an optical lens with predetermined optical properties. The optical properties include focal length, optical axis, field of view, aberration correction, optical power, optical magnification, and aperture size. The optical surface profile of the Micromirror Array Lens is formed to reproduce a free surface of having its characteristic optical property selected from the group of focal length, optical axis, field of view, aberration correction, optical power, optical magnification, and aperture size of the Micromirror Array Lens.

Since each micromirror has the same function as a mirror, the reflective surface should be highly reflective. The reflective surface of the micromirror is made of metal, metal compound, metal coated with multi-layer dielectric material, metal coated with antioxidant, or multi-layered dielectric material. The metal of the reflective surface is made of silver (Ag), aluminum (Al), gold (Au), nickel (Ni), chromium (Cr), or platinum (Pt) to have high reflectivity. The metal of the reflective surface is protected by a coating layer deposited on the reflective surface with material selected from the group consisting of silicon oxide ($SiO_2$), aluminum oxide ($Al_2O_3$), magnesium oxide (MgO), titanium oxide ($TiO_2$), cesium oxide ($CeO_2$), silicon nitride ($Si_3N_4$), titanium nitride (TiN), magnesium fluoride ($MgF_2$), zinc sulfide (ZnS), zinc selenide (ZnSe), polycarbonate, polyester, polyethylene naphthalate, or fluoropolymer. In addition, the surface of the micromirror can be made to have high reflectivity using many known microfabrication processes.

The micromirrors in the Micromirror Array Lens can have various shapes including fan shape, triangular shape, rectangular shape, square shape, hexagonal shape, and circular shape depending on the geometry of the free surface that the Micromirror Array Lens reproduces. A Micromirror Array Lens comprising fan shape micromirrors is appropriate to reproduce revolution symmetric free surfaces. A Micromirror Array Lens comprising square or rectangular shape micromirrors is appropriate to reproduce line symmetric free surfaces. Also, a Micromirror Array Lens comprising triangular or hexagonal shape micromirrors is appropriate to reproduce rotational symmetric free surfaces such as with six-fold or three-fold rotational symmetry or with arbitrary shape and/or size. The shape, position, and size of the optical element formed in the Micromirror Array Lens can be changed by independent control of the micromirrors.

It is desired that each of the micromirrors in the Micromirror Array Lens has a curvature because the ideal shape of a conventional reflective lens has a curvature. The micromirrors in the Micromirror Array Lens have a surface with a predetermined curvature. In addition, the micromirrors in the Micromirror Array Lens can have a curved surface with a variable curvature. The curvatures of the micromirrors can be controlled by electrothermal or electrostatic force. Also when the curvature of the micromirrors is fixed, the curvature of the micromirrors can be made using deformation of the micromirror structure. If the size of flat micromirrors is small enough, the aberration of the Micromirror Array Lens comprising the flat micromirrors is also small enough. In this case, the micromirrors are not required to have a curvature. Thus, the micromirrors in the Micromirror Array Lens can have a substantially flat surface.

The Micromirror Array Lens further comprises control circuitry constructed under the micromirrors by using microelectronics fabrication technologies. The control circuitry is configured to control the motions of the micromirrors. The Micromirror Array Lens further comprises actuating components and mechanical structures, disposed at the different level from the micromirrors and configured to make the micromirrors have multiple DOFs motion. The actuating components exert force to the micromirrors to make the micromirrors move. The force can be electrostatic fore or electromagnetic force. The mechanical structures are configured to uphold the micromirrors moved by the actuating components. Digital voltage or discrete voltage operation is preferable method to control the electrostatic force. The optical efficiency of the Micromirror Array Lens can be improved by increasing an effective reflective area. To increase the effective reflective area, the mechanical structures upholding the micromirrors and the actuating components such as electrodes, pads, and wires are disposed under the micromirrors. The micromirrors having the same motion in the Micromirror Array Lens can be controlled by common electrodes. Also, the micromirrors can be individually controlled to form an optical surface profile by known semiconductor microelectronics technologies such as MOS or CMOS. Regardless whether each micromirror is controlled individually or not, the micromirrors in the Micromirror Array Lens can be configured to have independent motions.

To have simplicity in control circuitry, the Micromirror Array Lens can be built so that the micromirrors are controlled by a common input signal to the control circuitry to form a desired optical surface profile and change the optical surface profile of the Micromirror Array Lens. With this method, the Micromirror Array Lens can be digitally or discretely controlled to have optical surface profiles with corresponding optical properties. The optical surface profile of the Micromirror Array Lens is changed discretely by controlling the micromirrors in the Micromirror Array Lens with discrete motions. Also, the number of the inputs can be reduced by using common input signals down to the number of optical surface profiles provided. To control a certain number of the optical surface profiles, only the same number of the electrical inputs is needed. Thus, the operating circuitry becomes extremely simple.

Micromirrors in the Micromirror Array Lens can be configured to have rotational and/or translational motion. The optical surface profile of the Micromirror Array Lens is determined by rotation and/or translation of the micromirrors. Each of the micromirrors can be configured to have one DOF translation, one DOF rotation, one DOF rotation and one DOF translation, two DOFs rotation, or two DOFs rotation and one DOF translation. The rotation of the micromirrors is mainly required to deflect incident light, which provides the Micromirror Array Lens with focusing and defocusing capability, light intensity control capability, light switching capability, variable optical property capability, and so forth. The translation of the micromirrors is mainly required to adjust the phase of the incident light, which provides the Micromirror Array Lens with phase correction capability and/or focusing capability to form a diffractive lens. The Micromirror Array Lens has different demands about required motions of the micromirrors depending on system geometry, performance criteria, cost consideration, control accuracy, and so on.

A micromirror having one DOF rotation rotates about an axis and is configured to have at least one rotational step. When the micromirror is configured to have a plurality of rotational steps, it can be controlled discretely and provide a Micromirror Array Lens with variable optical properties. The Micromirror Array Lens using these micromirrors is preferably used to reproduce a plurality of free surfaces having similar optical characteristics. For example, a Micromirror Array Lens comprising micromirrors having one DOF rotation can reproduce cylindrical free surfaces with various focal lengths or revolution symmetric free surfaces with various focal lengths. The micromirrors having the same rotational motion can be controlled by a common electrode or individually controlled by know semiconductor microelectronics technologies such as MOS (Metal-Oxide-Semiconductor) or CMOS (Complementary Metal-Oxide-Semiconductor). The Micromirror Array Lens with the micromirrors having only one DOF rotation may produce low quality images due to lack of phase correction capability. However, the Micromirror Array Lens comprising these micromirrors can have many advantages including easy fabrication, high precision control, and large rotational motion since the micromirror having one DOF rotation has simple mechanical structures and actuating components.

A micromirror having two DOFs rotation rotates about two axes and is configured to have at least one rotational step. When the micromirror is configured to have a plurality of rotational steps, it can be controlled discretely and provides a Micromirror Array Lens with variable optical properties. The Micromirror Array Lens with micromirrors having two DOFs rotation may produce low quality images due to lack of phase correction capability. However, the Micromirror Array Lens comprising theses micromirrors can be used to reproduce arbitrary free surfaces.

A micromirror having one DOF translation moves along the out of plane direction of a Micromirror Array Lens and is configured to have at least one translational step. The translation of the micromirror is mainly required to adjust the phase of incident light. According to Fresnel diffraction theory, a focus can be obtained by properly modulating the phase of wave front as in diffractive lenses such as zone plate (Eugene Hecht, "Optics" 2nd ed. Chap. 10, Addison-Wesley, 1987). The optical element formed by controlling pure translation of micromirrors may have the aberration causing lower image quality. However, if the size of the micromirrors is small enough, the Micromirror Array Lens comprising the micromirrors with pure translation can form a diffraction-limited variable focal length lens with a variable focal length. When the micromirrors are configured to have a plurality of translational steps, they can provide a diffraction-limited lens for various wavelengths. The Micromirror Array Lens with micromirrors having pure translation can have many advantages including easy fabrication, high precision control, large translational motion, applicability to wide range of wavelengths, since the micromirror having pure translation has simple mechanical structures and actuating components.

A Micromirror Array Lens comprising micromirrors having both rotation and translation can form a reflective variable focal length lens. Since light is a wave, all light reflected from the micromirrors can be modulated to have the same phase at an intended point (focus) by controlling the rotation and translation of the micromirrors. Also, the Micromirror Array Lens comprising micromirrors having both rotation and translation can correct aberration, which is caused by optical effects due to the medium between the object and its image or is caused by defects of a lens system that cause its image to deviate from the rules of paraxial imagery, by controlling rotation and translation of each micromirror individually.

A Micromirror Array Lens comprising micromirrors having one DOF rotation and one DOF translation can provide better quality image than a Micromirror Array Lens comprising micromirrors having one DOF rotation because the translational motion of micromirrors allows the Micromirror Array Lens to correct aberration due to the phase error.

A Micromirror Array Lens comprising micromirrors having two DOFs rotation and one DOF translation can provide high quality images, wherein each micromirror can be configured to be independently controlled. This Micromirror Array Lens can make an optical element with arbitrary shape and/or size modulating incident light arbitrarily.

A Micromirror Array Lens can reproduce virtually any free surface by controlling the rotational and/or translational motion of micromirrors. Majority of conventional lenses is spherical because spherical lenses are easy to manufacture and production cost is low. However, the spherical lenses cannot make parallel rays converge into one point. The aberration caused by spherical lenses increases as the aperture size of the spherical lenses increases. Thus, multiple lenses have to be combined to correct the problem. Since many lenses are assembled, there is limitation in achieving high performance especially for a large-aperture lens system. The large aperture lens system using spherical lens requires multiple additional large aperture lenses to correct aberration, which make the lens system bulky and impossible to use in compact portable systems. Alternatively, a single lens can be fabricated to have an aspherical surface in order to make parallel rays converge into one point or satisfy selected optical property requirements. The aspherical lens can reduce volume and weight of an optical system and provide high optical performance. For this reason, aspherical lenses have been used for beam projector, projection TV, CD-ROM pickup, DVD player, laser printer, laser scanning unit, etc. However, it is difficult to make an aspherical lens with actually required complicated aspheric surface with accuracy less than 0.1 μm using existing machine performance. In addition, it is difficult to measure the misbehavior of the lens produced with less than 0.1 μm accuracy.

Instead, the Micromirror Array Lens can reproduce free surfaces of various conventional reflective lenses such as a portion of surface of revolution of conic sections, aspherical surfaces, anamorphic surfaces, Fresnel type reflective surfaces, and diffractive optical element surfaces. In addition, a single Micromirror Array Lens can reproduce a plurality of free surfaces if the micromirrors in the Micromirror Array Lens are configured to have a plurality of motions. Therefore, the Micromirror Array Lens can work as a variable focal length lens as well as a fixed focal length lens. Furthermore, the Micromirror Array Lens can be used as various other optical elements; for example, the Micromirror Array Lens can function as an array of optical switches, a beam steerer, a zone plate, a shutter, an iris, a multiple focal length lens, other multi-functioning optical elements, and so on. The Micromirror Array Lens can form optical elements with accuracy less than 0.1 μm.

To be a good lens, the lens must satisfy two conditions. One is the convergence condition that all light rays scattered from one point of an object should converge into one point (focal point) on an image plane. The other is the phase matching condition that all converging light rays should have the same phase at the focal point. To satisfy these lens conditions, the surfaces of conventional reflective lenses are fabricated to have all light rays scattered by one point of an object be converged into one point on an image plane and have the Optical Path Length (OPL) of all converging light rays be the same. On the other hand, these lens conditions are satisfied in a different way in Micromirror Array Lenses that reproduce free surfaces of various conventional reflective lenses. Each micromirror in a Micromirror Array Lens is controlled to have rotational and/or translational motion to redirect scattered light rays from one point of an object into a focal point to satisfy the convergence condition. Because the micromirrors of the Micromirror Array Lens are usually arranged in a flat plane, the OPLs of light lays converged by rotation and/or translation of the micromirrors can be different. Although the OPLs of converging light rays are different, the same phase condition can be satisfied by adjusting the OPL by using the periodicity of light. If Optical Path Length Difference (ΔOPL) of light rays are integer multiples of a wavelength of light, the phase matching condition is satisfied at the focal point. Since the micromirrors are reflective elements, the required range of translational motion of the micromirrors is half wavelength. Half wavelength of translational motion is enough to satisfy the same phase condition by use of the periodicity of the light. The Micromirror Array Lens satisfies the phase matching condition by adjusting the rotational and/or translational motions of the micromirrors. The required maximum translational displacement is at least half wavelength of light. The rotations of the micromirrors in the Micromirror Array Lens can be determined by local gradients of a free surface. Each optical surface profile is formed to satisfy the same phase condition and the converging condition Furthermore, micromirrors in the Micromirror Array Lens can be arranged on a curved surface with a predetermined curvature such as a paraboloidal surface instead of a flat plane in order to facilitate obtaining a large numerical aperture with a small rotation of the micromirrors.

Each micromirror in the Micromirror Array Lens is configured to have a plurality of motions using microfabrication process. The general principle, structure and methods for making the discrete motion control of the micromirrors are disclosed in U.S. patent application Ser. No. 10/872,241 filed Jun. 18, 2004, U.S. patent application Ser. No. 11/072,597 filed Mar. 4, 2005, U.S. patent application Ser. No. 11/347,590 filed Feb. 4, 2006, U.S. patent application Ser. No. 11/369,797 filed Mar. 6, 2006, U.S. patent application Ser. No. 11/426,565 filed Jun. 26, 2006, U.S. patent application Ser. No. 11/463,875 filed Aug. 10, 2006, U.S. patent application Ser. No. 11/534,613 filed Sep. 22, 2006, U.S. patent application Ser. No. 11/534,620 filed Sep. 22, 2006, U.S. patent application Ser. No. 11/549,954 filed Oct. 16, 2006, U.S. patent application Ser. No. 11/609,882 filed Dec. 12, 2006, U.S. patent application Ser. No. 11/685,119 filed Mar. 12, 2007, U.S. patent application Ser. No. 11/693,698 filed Mar. 29, 2007, U.S. patent application Ser. No. 11/742,510 filed Apr. 30, 2007, and U.S. patent application Ser. No. 11/762,683 filed Jun. 13, 2007, all of which are incorporated herein by references.

A single Micromirror Array Lens comprising these micromirrors can reproduce a plurality of free surfaces by forming a plurality of optical surface profiles since each micromirror has a plurality of motions. The Micromirror Array Lens can have variable optical properties by changing the optical surface profile of the Micromirror Array Lens by controlling rotational and/or translational motions of the micromirrors. When the Micromirror Array Lens reproduces a plurality of free surfaces having different focal lengths, the Micromirror Array Lens can work as a variable focal length lens providing a variable focal length. A most widely used conventional variable focal length system is the one using two refractive lenses. The conventional variable focal length system has complex driving mechanisms to control the relative positions of refractive lenses and a slow response time. The variable focal length lens using the Micromirror Array Lens, however, has a simple structure because a single Micromirror Array Lens can provide variable optical properties without macroscopic movements of multiple lenses. Also, the variable focal length lens using the Micromirror Array Lens can be mass-produced with low cost using known semiconductor microelectronics technologies such as MOS or CMOS.

A Micromirror Array Lens can reproduce free surfaces of various conventional reflective lenses by forming corresponding optical surface profiles that satisfies the lens conditions by controlling rotational and/or translational motions of micromirrors. The Micromirror Array Lens comprising micromirrors with two DOFs rotation and/or one translation can reproduce virtually any reflective free surface including revolution symmetric free surfaces and non-revolution symmetric free surfaces. Revolution symmetric free surfaces can be readily reproduced by the Micromirror Array Lens comprising micromirrors using one DOF rotation and/or one DOF translation. The revolution symmetric free surfaces reproduced by the Micromirror Array Lens comprising micromirrors with one DOF rotation and/or one DOF translation include various portions of surface of revolution of a conic section and other polynomial surfaces found in conventional reflective lenses, wherein the conic section can be spherical, parabolic, hyperbolic, and elliptical conic section. Since the Micromirror Array Lens is a reflective optical element and usually positioned obliquely in an optical system, the Micromirror Array Lens may be required to reproduce more complicated shaped free surfaces different from those of revolution symmetric free surfaces. These non-revolution symmetric free surfaces such as line symmetry surface, anamorphic surface, and arbitrarily shaped surface are reproduced by the Micromirror Array Lens comprising micromirrors with at least one DOF rotation and/or one DOF translation. Also, some specialized optical elements can be reproduced by the Micromirror Array Lens such as optical switches, a beam steerer, a zone plate, a shutter, an iris, a multiple focal length lens, other multi-functioning optical elements, and so on.

Since the Micromirror Array Lens is a reflective optical element, the Micromirror Array Lens is usually positioned obliquely with respect to an optical axis of an optical system. In this case, the Micromirror Array Lens is configured to reproduce line symmetric free surfaces. A line of symmetry lies on the in-plane of the Micromirror Array Lens and is perpendicular to a tilting axis, wherein the tilting Although some exemplary free surfaces that can be reproduced by Micromirror Array Lenses are presented, any conventional or arbitrary free surfaces can be reproduced by Micromirror Array Lenses comprising micromirrors with rotational and/or translational motion.

Since a Micromirror Array Lens can modulate incident light's intensity, phase, or direction by controlling the motion of each micromirror individually, the Micromirror Array Lens is a spatial light modulator. The Micromirror Array Lens can be configured to have variable optical properties by changing the optical surface profile of the Micromirror Array Lens by controlling the micromirrors when the micromirrors have a plurality of motions.

The Micromirror Array Lens is configured to have a variable focal length, wherein the focal length of the Micromirror Array Lens is varied by changing the optical surface profile of the Micromirror Array Lens by controlling the micromirrors. The Micromirror Array Lens having variable optical properties can be used in many applications such as auto-focusing system, zoom system, three-dimensional imaging system, three-dimensional display system, and so on.

The Micromirror Array Lens is an adaptive optical component. The Micromirror Array Lens can compensate various types of optical distortions and aberrations of an optical system by controlling each micromirror independently. The Micromirror Array Lens can correct aberration, which is caused by optical effects due to the medium between an object and its image or is caused by defects of a lens system that cause its image to deviate from the rules of paraxial imagery. Also, the Micromirror Array Lens can correct aberration caused by misalignment of lens elements yielding optical tilt. In this case, the Micromirror Array Lens makes an object which lies off the optical axis imaged without macroscopic mechanical movement. Also, the Micromirror Array Lens can resolve the aberration problems in the conventional reflective or refractive lenses. Reflective lenses are usually arranged obliquely with respect to the image. Reflective lenses are fabricated to have either complicated lens surface satisfying lens conditions or simple lens surface such as spherical surface considering production cost. While the reflective lens having the lens surface satisfying lens conditions is impractically expensive especially for most portable systems, the reflective lens having a simple lens surface yields poor image quality due to aberration. The Micromirror Array Lens can reproduce complicated free surfaces without adding extra cost and resolve the aberration problem. Also, as the size of the conventional lens increases, the cost for reducing the aberration increases exponentially. The Micromirror Array Lens can reproduce a large scale free surface without extra cost for aberration correction. Independent control of each micromirror is possible by replacing electric circuits required for control with known MOS or CMOS technologies and fabricating the circuits underneath the micromirrors using known microfabrication methods, wherein wafer-level integration of micromirrors with the microelectronics circuits is required. The Micromirror Array Lens can be configured to have a variable aberration correction, wherein the aberration correction of the Micromirror Array Lens is varied by changing the optical surface profile of the Micromirror Array Lens by controlling the micromirrors.

Since the Micromirror Array Lens is a spatial light modulator, the Micromirror Array Lens also can be configured to have a variable optical axis, wherein the optical axis of the Micromirror Array Lens is varied by changing the optical surface profile of the Micromirror Array Lens by controlling the micromirrors. An object that does not lie on the optical axis can be imaged by the Micromirror Array Lens without any macroscopic mechanical movement of optical elements. While a variable optical axis function can be used passively in the optical system to compensate aberration caused by optical tilt or misalignment of lens elements, it can be also used actively in the optical tracking systems. The tracking system usually requires that the object be in the center of an image sensor. However, this usually requires a camera attitude control system with a macroscopic servo mechanism, which is slow and expensive to operate. In the current invention, it is possible to adjust the optical axis of the Micromirror Array Lens to place the object image in the center of the image sensor for a limited range without using a macroscopic servo mechanism. Therefore, when the Micromirror Array Lens is employed in the tracking system, it can have simple structure and light weight.

In addition, the Micromirror Array Lens can configured to have a variable aperture size, wherein the aperture size of the Micromirror Array Lens is varied by changing the optical surface profile of the Micromirror Array Lens by controlling the micromirrors. Also, the Micromirror Array Lens can be configured to have a variable field of view, wherein the field of view of the Micromirror Array Lens is varied by changing the optical surface profile of the Micromirror Array Lens by controlling the micromirrors. The Micromirror Array Lens can be configured to have a variable optical power, wherein the optical power of the Micromirror Array Lens is varied by changing the optical surface profile of the Micromirror Array Lens by controlling the micromirrors. Furthermore, the Micromirror Array Lens can be configured to have a variable optical power, wherein the optical power of the Micromirror Array Lens is varied by changing the optical surface profile of the Micromirror Array Lens by controlling the micromirrors.

The same phase condition satisfied by the Micromirror Array Lens contains an assumption of monochromatic light. Therefore, to get a color image, the Micromirror Array Lens is controlled to satisfy the same phase condition for each wavelength of Red, Green, and Blue (RGB), respectively, and the imaging system can use bandpass filters to make monochromatic lights with wavelengths of Red, Green, and Blue (RGB). If a color photoelectric sensor is used as an imaging sensor in the imaging system using a Micromirror Array Lens, a color image can be obtained by processing electrical signals from Red, Green, and Blue (RGB) imaging sensors with or without bandpass filters, which should be synchronized with the control of the Micromirror Array Lens. To image Red light scattered from an object, the Micromirror Array Lens is controlled to satisfy the phase condition for Red light. During the operation, Red, Green, and Blue imaging sensors measure the intensity of each Red, Green, and Blue light scattered from an object. Among them, only the intensity of Red light is stored as image data because only Red light is imaged properly. To image each Green or Blue light, the Micromirror Array Lens and each imaging sensor works in the same manner as the process for the Red light. Therefore, the Micromirror Array Lens is synchronized with Red, Green, and Blue imaging sensors. Alternatively, the same phase condition for a color image is satisfied by using the least common multiple of wavelengths of Red, Green, and Blue lights as an effective wavelength for the phase condition. In this case, the Micromirror Array Lens is not necessary to be controlled to satisfy the phase condition for each Red, Green, and Blue light individually. Instead, the phase condition for the least common multiple of the wavelengths should be satisfied. For the simpler control, the translation of each micromirror is only controlled to satisfy the phase condition for one light among Red, Green, and Blue lights or is not controlled to satisfy the phase condition for any other lights of Red, Green, and Blue. Even though the Micromirror Array Lens cannot satisfy the phase condition due to phase error of lights with multi-wavelength, still the lens can be used as a variable focal length lens with low image quality.

The Micromirror Array Lens has high versatility as described above, thus it can work as various optical elements. Beside functions as a variable focal length lens and/or a variable optical axis aforementioned, the Micromirror Array Lens can function as a fixed focal length lens, an array of optical switches, a beam steerer, a zone plate, a shutter, an iris, a multiple focal length lens, other multi-functioning optical elements, and so on.

The Micromirror Array Lens can have a fixed optical surface profile to provide a fixed focal length. The Micromirror Array Lens is fabricated to have a fixed optical surface profile using surface profile shape memory technique. No matter how complicated the designed free surface is, it can be easily formed in a Micromirror Array Lens and simply fabricated by the mass production process. The fixed focal length Micromirror Array Lens replaces various conventional reflective lenses with low cost. Also, the fixed focal length Micromirror Array Lens can be fabricated to reproduce various complicated free surfaces that can be difficult to make or very expensive to produce.

A single Micromirror Array Lens can be configured to provide multiple focal lengths at one time. Multiple free surfaces with different focal lengths are reproduced in one Micromirror Array Lens at one time.

The Micromirror Array Lens comprising micromirrors with one DOF translation can work as a zone plate as described above. The zone plate comprises a plurality of zones, wherein each of the zones are a concentric ring comprising at least one micromirror and un-overlapped with the other zones. The micromirrors are arranged so that the zones has the same area and ΔOPL between an OPL from one zone to a focal point and the other OPL from its adjacent zone to the focal point is half wavelength of light, wherein the micromirrors in every other zone are translated to compensate half wavelength phase difference between two adjacent zones, wherein the area of the zones is determined by a focal length of the zone plate. The micromirrors in every other zone are translated to compensate half wavelength phase difference between two adjacent zones. The zone plate using a Micromirror Array Lens can be a variable focal length lens having a variable focal length, wherein the focal length of the zone plate is changed by re-zoning of the micromirrors, wherein the focal length determines the area of the zones. On the other hand, each of the micromirrors can be configured to have a plurality of translational motions and controlled to form the zone plates for a plurality of wavelengths of light, wherein the wavelength of the light determines the area of the zones.

Since each micromirror can have a plurality of motions and be controlled individually, the Micromirror Array Lens can work as more than a simple lens.

The micromirrors in the Micromirror Array Lens can be used as optical switches, wherein the micromirrors at the on status reflect incident light onto an area of interest such as screen and image sensor and the micromirrors at the off status reflect the incident light out of the area of interest. Micromirrors in conventional micromirror devices have been used as optical switches but each micromirror has only two positions including on and off positions. When the micromirrors in the conventional micromirror devices change their statuses, some light traversal patterns may occur on an image due to repeated light traverses over the same direction. To avoid this problem, the micromirrors of the present invention can be configured to reflect the incident light to a plurality of directions out of the area of interest at the off status since each micromirror can have a plurality of motions.

The Micromirror Array Lens can be used as a beam steerer. The Micromirror Array Lens can focus light and steer the focused light across an area of interest by changing the optical surface profiles of the Micromirror Array Lens by controlling motions of the micromirrors. The Micromirror Array Lens can be used as the beam steerer for scanners, printers, projectors, and so forth.

The Micromirror Array Lens can be used as an optical shutter. While conventional optical shutters block or attenuate incident light, the optical shutter of the present invention does not uses beam blocks or attenuators. The Micromirror Array Lens reflects the incident light out of the area of interest such an image sensor to block the incident light by controlling motions of the micromirrors when the shutter is on while the Micromirror Array Lens reflects the incident light onto the image sensor by controlling motions of the micromirrors when the shutter is off. The Micromirror Array Lens is configured to have optical shutter function wherein at least one of the optical surface profile of the Micromirror Array Lens makes incident light redirected out of an image sensor when the optical shutter function is on Also, the Micromirror Array Lens can be used as multi-functional optical elements. As an example, the Micromirror Array Lens can provide both lens function and shutter function to an imaging system. The Micromirror Array Lens is configured to focus the incident light an image sensor to image when the shutter function is off and redirect the incident light out of the image sensor to block the incident light when the shutter is on.

Furthermore, the Micromirror Array Lens can have a reflective Fresnel lens function having variable optical properties as well as shutter function. The Micromirror Array Lens forms a plurality of optical surface profiles by controlling motions of the micromirrors when the shutter function is off while the Micromirror Array Lens redirects the incident light out of the image sensor to block the incident light when the shutter is on.

The Micromirror Array Lens can be used as an iris device. The iris device changes its aperture size to regulate an amount of light admitted to an area of interest such as an image sensor. The Micromirror Array Lens with iris function of the present invention comprises a plurality of micromirrors and is configured to provide an adjustable aperture having a plurality of aperture sizes by controlling motions of the micromirrors. The adjustable aperture controls the amount of incident light admitted to the image sensor by changing the aperture size.

As another example for multi-functional optical elements, the Micromirror Array Lens can provide both reflective Fresnel lens function and iris function to an imaging system. The active micromirrors are configured to form a reflective Fresnel lens having at least one optical surface profile by controlling motions of the active micromirrors while the inactive micromirrors are configured to reflect incident light out of the image sensor. Furthermore, the Micromirror Array Lens for each aperture size can have variable optical properties with a variable focal length and/or a variable optical axis as well as shutter function.

A Micromirror Array Lens can be configured to have a plurality of variable optical properties in one single optical system selected from a variable focal length, variable optical axis, variable aberration correction, variable optical power, variable field of view, variable optical magnification, and variable aperture size. These features can be advantageously used in the optical pick-up system, image stabilizer, tracking system, and so on.

In another embodiment of the present invention, a Micromirror Array Lens comprising a plurality of micromirrors, wherein each of the micromirrors has a reflective surface and is configured to have a plurality of motions, wherein the Micromirror Array Lens is configured to form a plurality of optical surface profiles and have at least one variable optical property, wherein the optical property can be a focal length, an optical axis, an aberration correction, an optical power, a field of view, an optical magnification, and an aperture size of the Micromirror Array Lens.

In another embodiment of the present invention, a Micromirror Array Lens comprising a plurality of micromirrors, wherein each of the micromirrors has a reflective surface, wherein the Micromirror Array Lens is configured to form an optical surface profile reproducing an arbitrary free surface, wherein the arbitrary free surface includes a spherical free surface, an aspherical free surface, a portion of surface of revolution of a conic section, a revolution symmetric free surface, a line symmetric free surface, an anamorphic surface, a continuous free surface, a discrete free surface, a Fresnel type reflective surface, and a diffractive optical element surface.

The advantages of the present invention are: (1) the Micromirror Array Lens has a very fast response time because each micromirror has a tiny mass; (2) the Micromirror Array Lens reproduces an arbitrary free surface; (3) the Micromirror Array Lens provide variable optical properties including a variable focal length and/or a variable optical axis; (4) the Micromirror Array Lens has a large focal length variation because a large numerical aperture variation can be achieved by increasing the maximum rotational angle of the micromirror; (5) the Micromirror Array Lens has a variable optical axis without macroscopic movement of the lens system; (6) the Micromirror Array Lens has a high optical focusing efficiency; (7) the Micromirror Array Lens can have a large size aperture without losing optical performance. Because the Micromirror Array Lens consists of discrete micromirrors, the increase in the Micromirror Array Lens size does not cause the increase in aberration caused by shape error of the Micromirror Array Lens; (8) the Micromirror Array Lens can correct various optical effects; (9) the Micromirror Array Lens has a low cost because of the advantages of its mass productivity; (10) the Micromirror Array Lens makes the focusing system much simple; (11) the Micromirror Array Lens can have arbitrary shape and/or size.

Although the present invention is briefly summarized, the full understanding of the invention can be obtained by the following drawings, detailed description, and appended claims.

DESCRIPTION OF THE FIGURES

These and other features, aspects, and advantages of the present invention will become better understood with reference to the accompanying drawings, wherein.

DETAILED DESCRIPTION OF THE ILLUSTRATED EMBODIMENTS

A Micromirror Array Lens comprises a plurality of micromirrors arranged on a flat or a curved surface to reflect incident light. The micromirrors are configured to have at least one motion. The Micromirror Array Lens has at least one optical surface profile to form at least one optical element reproducing at least one free surface by using the motions of the micromirrors. The free surface can be any two or three-dimensional continuous or discrete reflective surface. The Micromirror Array Lens having the corresponding optical surface profile provides optical focusing properties substantially identical to those of the free surface.

Figure 1:
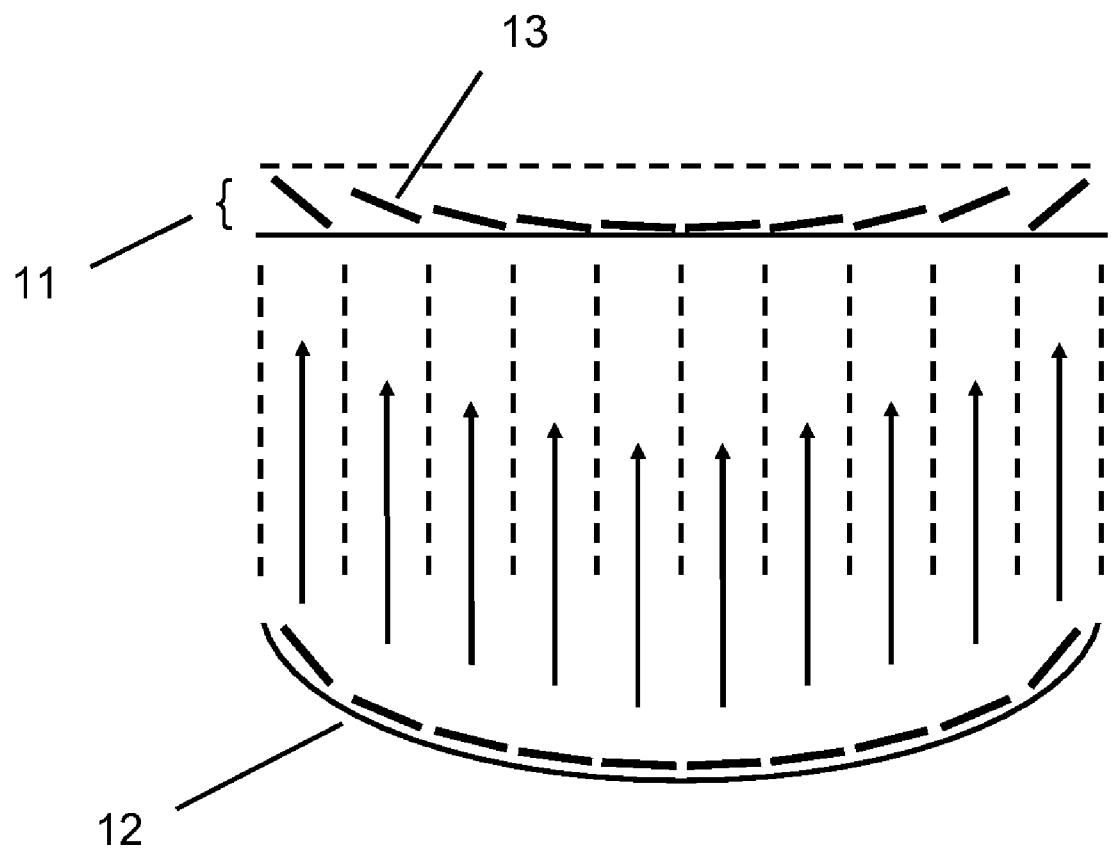
FIG. 1 illustrates the principle of a Micromirror Array Lens schematically.

FIG. 1 illustrates the principle of a Micromirror Array Lens 11 schematically. The Micromirror Array Lens 11 comprises a plurality of micromirrors 12 and replaces an ordinary single-bodied free surface 13. The Micromirror Array Lens 11 forms a refractive Fresnel lens or a diffractive Fresnel lens that satisfies the focusing properties of the ordinary single-bodied free surface 13.

Since each micromirror has the same function as a mirror, the reflective surface of the micromirror is made of metal, metal compound, multi-layered dielectric material, or other materials with high reflectivity such as aluminum coated with multi-layer dielectric material, aluminum coated with anti-oxidant, silver coated with multi-layer dielectric material, silver coated with antioxidant, gold, and gold coated with multi-layer dielectric material. The surface of the micromirror can be made to have high reflectivity using many known microfabrication processes.

The micromirrors in the Micromirror Array Lens can have various shapes including fan shape, triangular shape, rectangular shape, square shape, hexagonal shape, and circular shape depending on the geometry of the optical element that the Micromirror Array Lens reproduces. A Micromirror Array Lens comprising fan shape micromirrors is appropriate to reproduce revolution symmetric free surfaces. A Micromirror Array Lens comprising square or rectangular shape micromirrors is appropriate to reproduce line symmetric free surfaces. Also, a Micromirror Array Lens comprising triangular or hexagonal shape micromirrors is appropriate to reproduce rotational symmetric free surfaces such as with six-fold rotational symmetry or with arbitrary shape and/or size.

Figure 2:
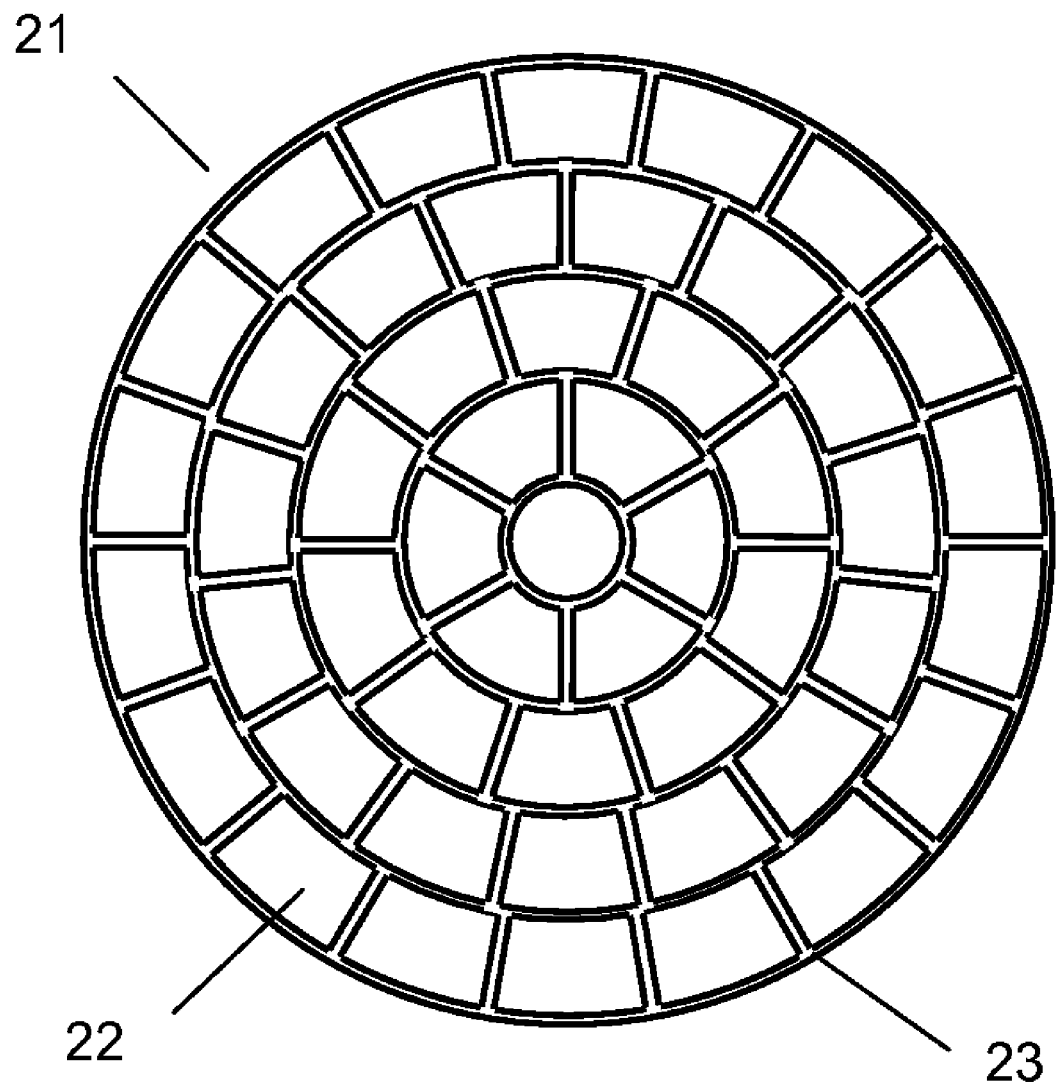
FIG. 2 shows a schematic illustration of a Micromirror Array Lens comprising fan shape micromirrors and reproducing a revolution symmetric free surface.

FIG. 2 shows a schematic illustration of a Micromirror Array Lens 21 comprising fan shape micromirrors 22 and reproducing a revolution symmetric free surface. The fan shape micromirrors 22 facilitate to reproduce the revolution symmetric free surface when they are arranged in a polar array. The fan shape micromirrors 22 are arranged to form one or more concentric circles and their motions are controlled to form revolution symmetric optical surface profiles 23. The micromirrors on a ring between two consecutive concentric circles are controlled by a common actuating component or controlled individually by a plurality of individual actuating components by known semiconductor microelectronics technologies such as MOS or CMOS. The fan shape micromirrors 22 can make optical efficiency increase by increasing effective reflective area.

Figure 3:
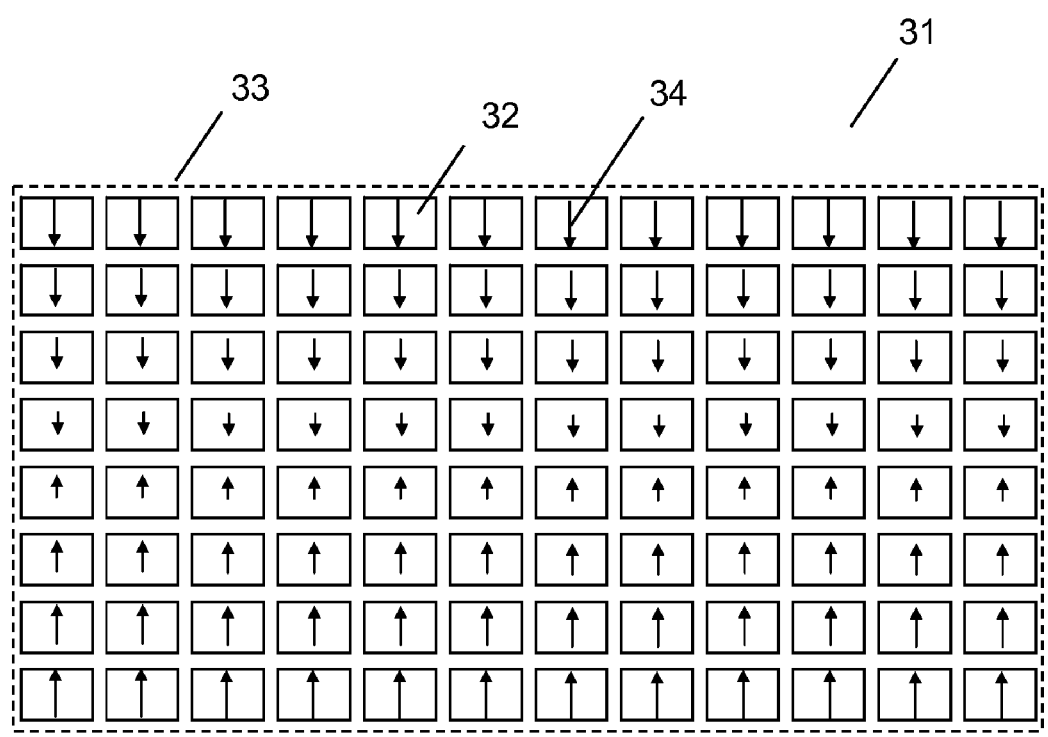
FIG. 3 shows a schematic illustration of a Micromirror Array Lens comprising rectangular shape micromirrors and reproducing a cylindrical free surface.

FIG. 3 shows a schematic illustration of a Micromirror Array Lens 31 comprising rectangular shape micromirrors 32 and reproducing a cylindrical free surface. The cylindrical free surface is reproduced by a linear or two-dimensional area array of the rectangular shape micromirrors 32. The motions of the rectangular shape micromirrors are controlled to form cylindrical optical surface profiles 33. Micromirrors with the same rotation can be controlled by a common electrode or corresponding individual electrodes independently. The rotational amount of a micromirror 32 is represented by length of a corresponding arrow 34 and the profile gradient direction to represent a rotational direction of the micromirror 32 is represented by direction of the corresponding arrow 34. These conventions representing the rotation of micromirrors are also applied to other examples shown in FIGS. 4, 5, and 6. The Micromirror Array Lens with an array of square or rectangular shape micromirrors is appropriate to reproduce line symmetric free surfaces.

Figure 4:
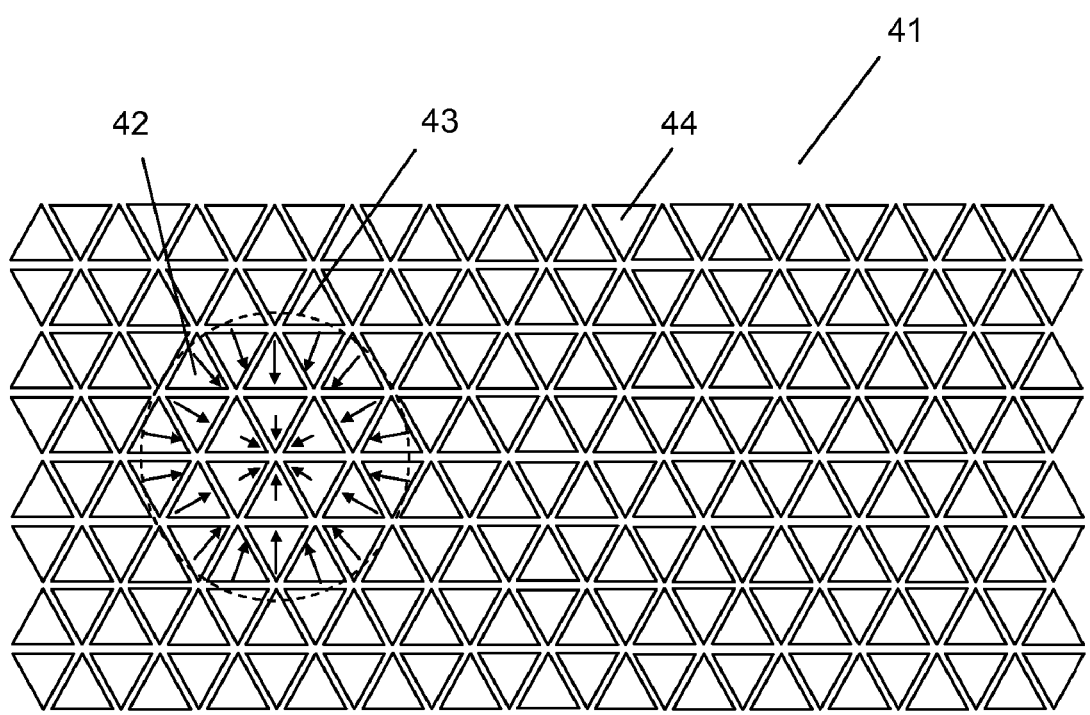
FIG. 4 shows a schematic illustration of a Micromirror Array Lens comprising triangular shape micromirrors and reproducing a circular free surface.

FIG. 4 shows a schematic illustration of a Micromirror Array Lens 41 comprising triangular shape micromirrors 42 and reproducing a free surface with a circular shape aperture. The free surface with the circular shape aperture is reproduced by a two-dimensional area array of the triangular shape micromirrors 42. The motions of the triangular shape micromirrors 42 are controlled to form optical surface profiles 43 with circular shape apertures. Micromirrors with the same rotation can be controlled by a common electrode or corresponding individual electrodes independently. Redundant micromirrors 44 which are not elements of the formed optical element are controlled to make incident light reflected by the redundant micromirrors 44 have no influence on imaging or focusing. The shape, position, and size of the formed optical element can be changed by independent control of the micromirrors.

The Micromirror Array Lens with an array of triangular shape micromirrors is appropriate to form free surfaces with rotational symmetry or with arbitrary shape and/or size.

Figure 5:
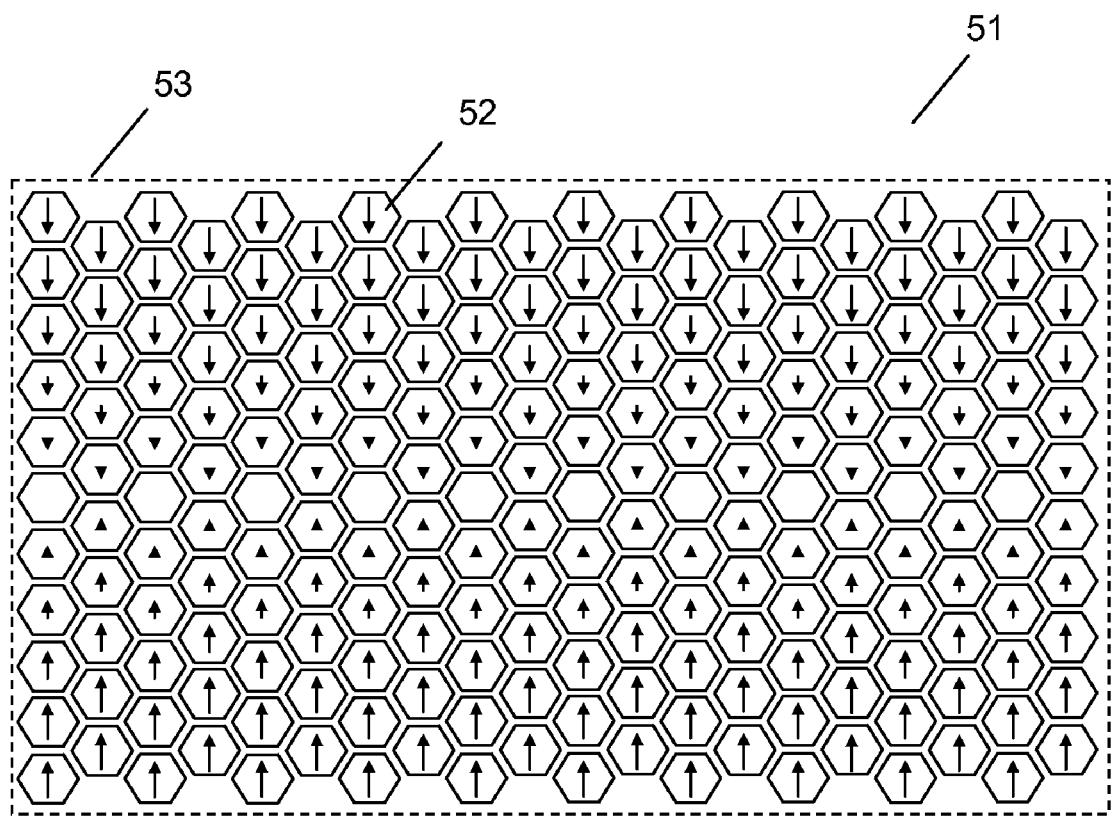
FIG. 5 shows a schematic illustration of a Micromirror Array Lens comprising hexagonal shape micromirrors and reproducing a cylindrical free surface.

FIG. 5 shows a schematic illustration of a Micromirror Array Lens 51 comprising hexagonal shape micromirrors 52 and reproducing a cylindrical free surface. The cylindrical free surface is reproduced by a two-dimensional area array of the hexagonal shape micromirrors 52. The motions of the hexagonal shape micromirrors are controlled to form cylindrical optical surface profiles 53. Micromirrors with the same rotation can be controlled by a common electrode or corresponding individual electrodes independently.

Figure 6:
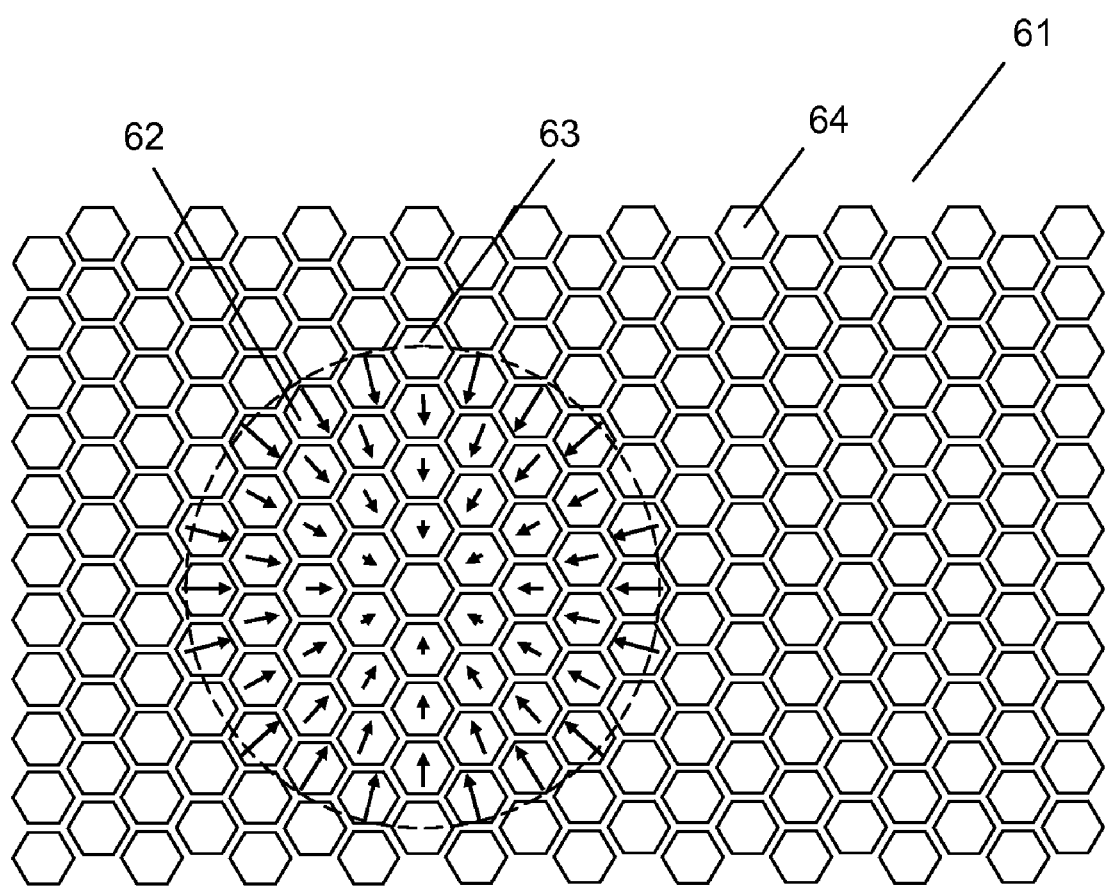
FIG. 6 shows a schematic illustration of a Micromirror Array Lens comprising hexagonal shape micromirrors and reproducing a free surface with a circular shape aperture.

FIG. 6 shows a schematic illustration of a Micromirror Array Lens 61 comprising hexagonal shape micromirrors 62 and reproducing a free surface with a circular shape aperture. The motions of the hexagonal shape micromirrors 62 are controlled to form optical surface profiles 63 with circular shape apertures. Micromirrors with the same rotation can be controlled by a common electrode or corresponding individual electrodes independently. Redundant micromirrors 64 which are not elements of the formed optical element are controlled to make incident light reflected by the redundant micromirrors 64 have no influence on imaging or focusing. The shape, position, and size of the formed optical element can be changed by independent control of the micromirrors.

As shown in FIGS. 5 and 6, the Micromirror Array Lens with an array of hexagonal shape micromirrors is appropriate to form free surfaces with rotational symmetry or with arbitrary shape and/or size.

It is desired that each of the micromirrors in the Micromirror Array Lens has a curvature because the ideal shape of a conventional reflective lens has a curvature. If the size of flat micromirrors is small enough, the aberration of the Micromirror Array Lens comprising the flat micromirrors is also small enough. In this case, the micromirrors are not required to have a curvature.

Figure 7:
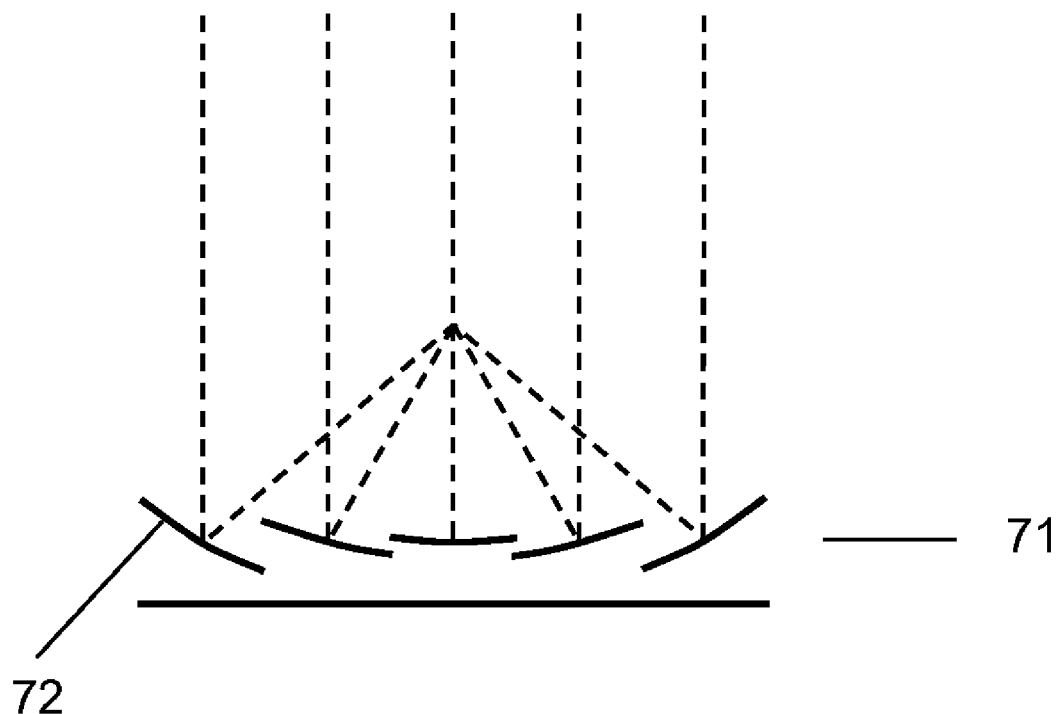
FIG. 7 shows a schematic illustration of a Micromirror Array Lens, wherein each micromirror has a curvature corresponding to a segment of a circle or a parabola.

FIG. 7 shows a schematic illustration of a Micromirror Array Lens 71, wherein each micromirror 72 has a curvature corresponding to a segment of a circle or a parabola. The profiles of the micromirrors 72 are preferably circular or parabolic in order to increase the focusing efficiency of the Micromirror Array Lens. As the required optical focusing property of the Micromirror Array Lens 71 changes, the curvatures of micromirrors 72 have to be changed. The curvatures of the micromirrors 72 are controlled by electrothermal or electrostatic force. If the size of flat micromirrors is small enough, the aberration of the Micromirror Array Lens comprising the flat micromirrors is also small enough. In this case, the micromirrors are not required to have to have a curvature.

The Micromirror Array Lens further comprises control circuitry constructed under the micromirrors by using microelectronics fabrication technologies. The control circuitry is configured to control the motions of the micromirrors. Also, the Micromirror Array Lens further comprise actuating components disposed at the different level from the micromirrors configured to make the micromirrors move and mechanical structures configured to uphold the micromirrors moved by the actuating components. The micromirrors are moved by electrostatical force and/or electromagnetical force exerted through the actuating components. Digital voltage or discrete voltage operation is preferable method to control the electrostatic force. The optical efficiency of the Micromirror Array Lens can be improved by increasing an effective reflective area. To increase the effective reflective area, the mechanical structures upholding the micromirrors and the actuating components such as electrodes pads and wires are disposed under the micromirrors. The micromirrors having the same motion in the Micromirror Array Lens can be controlled by common electrodes. Also, the micromirrors can be individually controlled by known semiconductor microelectronics technologies such as MOS or CMOS. Regardless whether each micromirror is controlled individually or not, the micromirrors in the Micromirror Array Lens can be configured to have independent motions.

To have simplicity in control circuitry, the Micromirror Array Lens can be built so that the micromirrors are controlled by a common input signal to the electrodes to form an optical surface profile. With this method, the Micromirror Array Lens can be digitally or discretely controlled to have optical surface profiles with corresponding optical properties. Also, the number of the inputs can be reduced by using common input signals down to the number of optical surface profiles provided. To control a certain number of the optical surface profiles, only the same number of the electrical inputs is needed. Thus, the operating circuitry becomes extremely simple.

Micromirrors in the Micromirror Array Lens can be configured to have rotational and/or translational motion. The rotation of the micromirrors is mainly required to deflect incident light, which provides the Micromirror Array Lens with focusing and defocusing capability, light intensity control capability, light switching capability, variable optical property capability, and so forth. The variable optical property may include a variable focal length and/or a variable optical axis. The translation of the micromirrors is mainly required to adjust the phase of the incident light, which provides the Micromirror Array Lens with phase correction capability and/or focusing capability to form a diffractive lens. Each optical element has different demands about required motions of the micromirrors depending on system geometry, performance criteria, cost consideration, control accuracy, and so on.

A micromirror having one DOF (Degree Of Freedom) rotation rotates about an axis and is configured to have at least one rotational step. When the micromirror is configured to have a plurality of rotational steps, it can be controlled discretely and provide a Micromirror Array Lens with a variable optical property. The Micromirror Array Lens using these micromirrors is preferably used to reproduce a plurality of free surfaces having similar optical characteristics. For example, A Micromirror Array Lens comprising micromirrors having one DOF rotation can reproduce cylindrical free surfaces with various focal lengths or revolution symmetric free surfaces with various focal lengths. The micromirrors having the same rotational motion can be controlled by a common electrode or individually controlled by know semiconductor microelectronics technologies such as MOS or CMOS. The Micromirror Array Lens with the micromirrors having only one DOF rotation may produce low quality images due to lack of phase correction capability. However, the Micromirror Array Lens comprising these micromirrors can have many advantages including easy fabrication, high precision control, and large rotational motion since the micromirror having one DOF rotation has a simple mechanical structure and simple actuating components.

A micromirror having two DOFs rotation rotates about two axes and is configured to have at least one rotational step. When the micromirror is configured to have a plurality of rotational steps, it can be controlled discretely and provides a Micromirror Array Lens with a variable optical property. The Micromirror Array Lens with micromirrors having two DOF rotation may produce low quality images due to lack of phase correction capability. However, the Micromirror Array Lens comprising theses micromirrors can be used to reproduce arbitrary free surfaces.

A micromirror having one DOF translation moves along the out of plane direction of a Micromirror Array Lens and is configured to have at least one translational step. The translation of the micromirror is mainly required to adjust the phase of incident light. According to Fresnel diffraction theory, a focus can be obtained by properly modulating the phase of wave front as in diffractive lenses such as zone plate. The optical element formed by controlling pure translation of micromirrors may have the aberration causing lower image quality. However, if the size of the micromirrors is small enough, the Micromirror Array Lens comprising the micromirrors with pure translation can form a diffraction-limited variable focal length lens with a variable focal length. When the micromirrors are configured to have a plurality of translational steps, they can provide a diffraction-limited lens for various wavelengths. The Micromirror Array Lens with micromirrors having pure translation can have many advantages including easy fabrication, high precision control, large translational motion, applicability to wide range of wavelengths, since the micromirror having pure translation has a simple mechanical structure and simple actuating components.

A Micromirror Array Lens comprising micromirrors having both rotation and translation can form a reflective variable focal length lens having a variable focal length. Since light is a wave, all light reflected from the micromirrors can be modulated to have the same phase at an intended point (focus) by controlling the rotation and translation of the micromirrors. Also, the Micromirror Array Lens comprising micromirrors having both rotation and translation can correct aberration, which is caused by optical effects due to the medium between the object and its image or is caused by defects of a lens system that cause its image to deviate from the rules of paraxial imagery, by controlling rotation and translation of each micromirror individually.

A Micromirror Array Lens comprising micromirrors having one DOF rotation and one DOF translation can provide better quality image than a Micromirror Array Lens comprising micromirrors having one DOF rotation because the translational motion of micromirrors allows the Micromirror Array Lens to correct aberration due to the phase error.

A Micromirror Array Lens comprising micromirrors having two DOFs rotation and one DOF translation can provide high quality images, wherein each micromirror is configured to be independently controlled. This Micromirror Array Lens can make an optical element with arbitrary shape and/or size modulating incident light arbitrarily.

Figure 8:
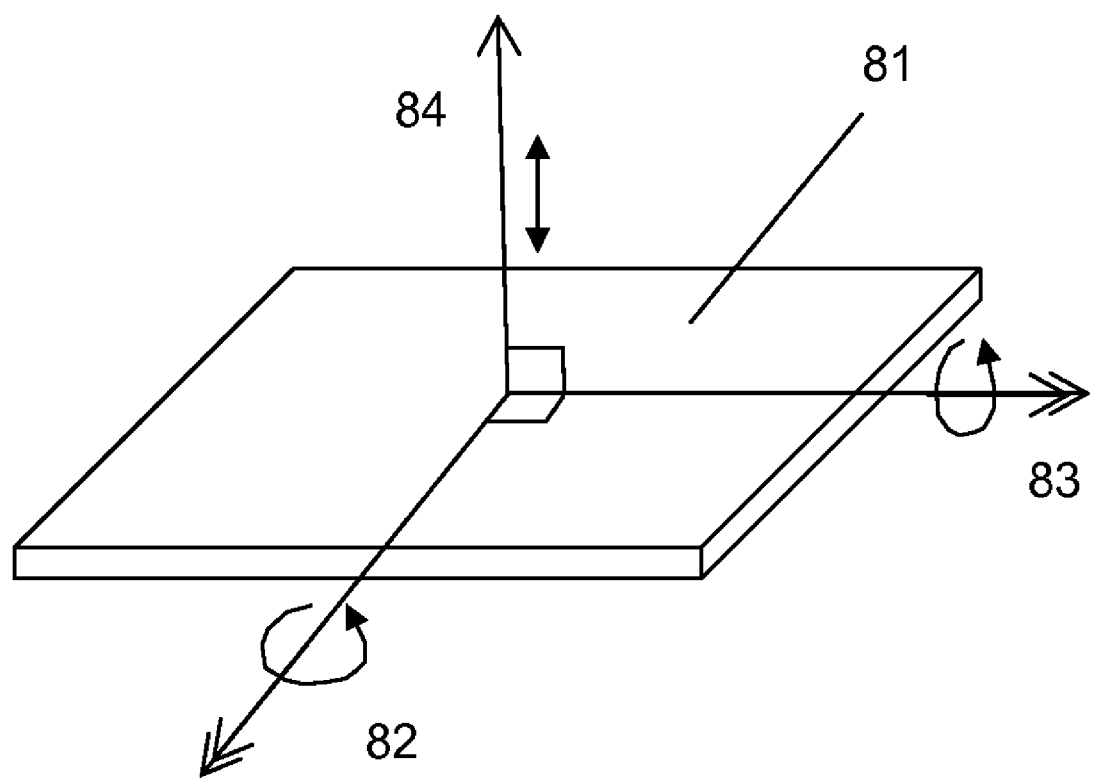
FIG. 8 shows a schematic illustration of a micromirror having two DOFs rotation and one DOF translation.

FIG. 8 shows a schematic illustration of a micromirror 81 having two DOFs rotation 82, 83 and one DOF translation 84. The array comprising the micromirrors 81 with two DOFs rotation 82, 83 and one DOF translation 84, which are controlled independently, makes an optical element lens with arbitrary shape and/or size. Incident light is deflected to an arbitrary direction by controlling two DOFs rotation 82, 83 and the phase of the incident light is adjusted by controlling one DOF translation 84 of each micromirror 81.

A Micromirror Array Lens can reproduce virtually any free surface by controlling the rotational and/or translational motion of micromirrors. Majority of conventional lenses is spherical because spherical lenses are easy to manufacture and production cost is low. However, the spherical lenses cannot make parallel rays converge into one point. The aberration caused by spherical lenses increases as the aperture size of the spherical lenses increases. Thus, multiple lenses have to be combined to correct the problem. Since many lenses are assembled, there is limitation in achieving high performance especially for a large-aperture lens system. The large aperture lens system using spherical lens requires multiple additional large aperture lenses to correct aberration, which make the lens system bulky and impossible to use in compact portable systems. Alternatively, a single lens can be fabricated to have an aspherical surface in order to make parallel rays converge into one point or satisfy selected focusing property requirements. The aspherical lens can reduce volume and weight of an optical system and provide high optical performance. For this reason, aspherical lenses have been used for beam projector, projection TV, CD-ROM pickup, DVD player, laser printer, laser scanning unit, etc. However, it is difficult to make an aspherical lens with actually required complicated aspheric surface with accuracy less than 0.1 μm using existing machine performance. In addition, it is difficult to measure the misbehavior of the lens produced with less than 0.1 μm accuracy.

Instead, the Micromirror Array Lens can reproduce free surfaces of various conventional reflective lenses including aspherical reflective lenses as well as spherical reflective lenses. In addition, a single Micromirror Array Lens can reproduce a plurality of free surfaces if the micromirrors in the Micromirror Array Lens are configured to have a plurality of motions. Therefore, the Micromirror Array Lens can work as a variable focal length lens as well as a fixed focal length lens. Furthermore, the Micromirror Array Lens can be used as various other optical elements; for example, the Micromirror Array Lens can function as an array of optical switches, a beam steerer, a zone plate, a shutter, an iris, a multiple focal length lens, other multi-functioning optical elements, and so on. The Micromirror Array Lens can form optical elements with accuracy less than 0.1 μm.

To be a good lens, the lens must satisfy two conditions. One is the convergence condition that all light rays scattered from one point of an object should converge into one point (focal point) on an image plane. The other is the phase matching condition that all converging light rays should have the same phase at the focal point. To satisfy these lens conditions, the surfaces of conventional reflective lenses are fabricated to have all light rays scattered by one point of an object be converged into one point on an image plane and have the Optical Path Length (OPL) of all converging light rays be the same. On the other hand, these lens conditions are satisfied in a different way in Micromirror Array Lenses that reproduce free surfaces of various conventional reflective lenses. Each micromirror in a Micromirror Array Lens is controlled to have rotational and/or translational motion to redirect scattered light rays from one point of an object into a focal point to satisfy the convergence condition. Because the micromirrors of the Micromirror Array Lens are usually arranged in a flat plane, the OPLs of light lays converged by rotation and/or translation of the micromirrors can be different. Although the OPLs of converging light rays are different, the same phase condition can be satisfied by adjusting the OPL by using the periodicity of light. If Optical Path Length Difference (ΔOPL) of light rays are integer multiples of a wavelength of light, the phase matching condition is satisfied at the focal point. Since the micromirrors are reflective elements, the required range of translational motion of the micromirrors is half wavelength. Half wavelength of translational motion is enough to satisfy the same phase condition by use of the periodicity of the light. The Micromirror Array Lens satisfies the phase matching condition by adjusting the rotational and/or translational motions of the micromirrors.

Figure 9:
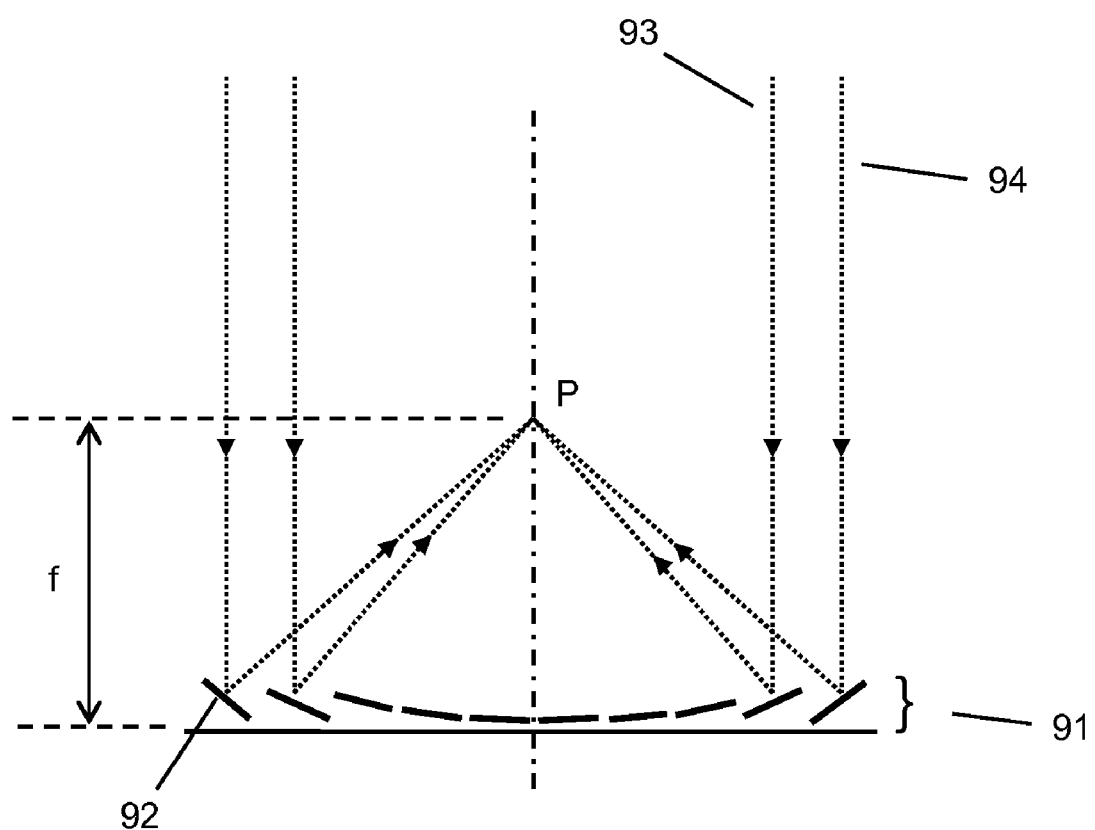
FIG. 9 shows a schematic illustration of a Micromirror Array Lens forming optical surface profiles to satisfy convergence condition and/or phase matching condition.

FIG. 9 shows a schematic illustration of a Micromirror Array Lens 91 forming optical surface profiles to satisfy convergence condition and/or phase matching condition. The optical surface profile of the Micromirror Array Lens 91 comprising micromirrors 92 satisfies the convergence condition, wherein arbitrary scattered light rays 93, 94 are converged into one point P on an image plane by adjusting the rotational and/or translational motions of each micromirror. Also, the surface profile of the Micromirror Array Lens 91 satisfies the phase matching condition, wherein the phases of all converging light rays at the converging point P on the image plane are adjusted to be the same by controlling the rotational and/or translational motion of each micromirror 92. Even though the optical path lengths of light rays 93, 94 converged by the Micromirror Array Lens 91 are different from those of an equivalent conventional reflective lens, the same phase condition is satisfied by adjusting the phases of light rays 93, 94 because the phase of light is periodic. The required maximum translational displacement is at least half wavelength of light.

Figure 10:
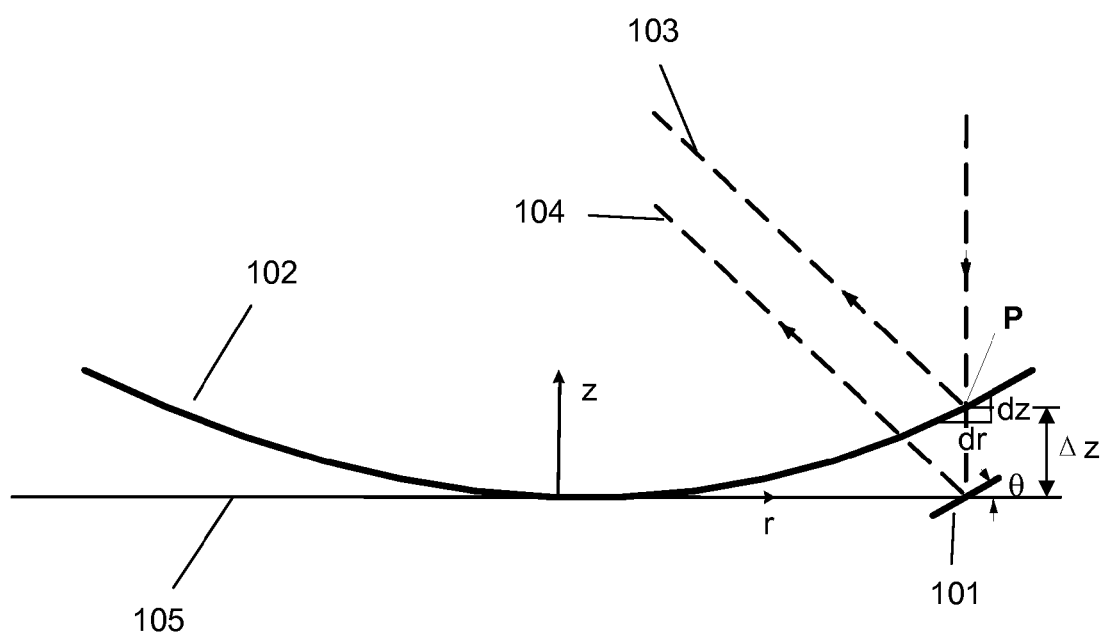
FIG. 10 shows a schematic illustration of a micromirror reproducing a part of a continuous reflective free surface with revolution symmetry to show how to determine the rotation of the micromirrors in a Micromirror Array Lens.

The rotations of the micromirrors in the Micromirror Array Lens can be determined by local gradients of a free surface. FIG. 10 shows a schematic illustration of a micromirror 101 reproducing a part of a continuous reflective free surface 102 with revolution symmetry to show how the rotation of the micromirrors 101 in a Micromirror Array Lens is determined. The free surface 102 can be expressed in $$z=f(r)$$

where z is profile of the free surface 102 and r is a radial component in the cylindrical coordinate system. Rotation angle θ of the micromirror 101 is calculated from the gradient z ($=dz/dr$) of z. The direction of a light ray 103 reflected by the free surface 102 is the same as that of a light ray 104 reflected by the micromirror 101 in the Micromirror Array Lens because r-directional gradient of the free surface at a point P is reproduced by the rotation of the micromirror 101.

The free surfaces are not limited to revolution symmetric surfaces. Therefore, in general, the surface profile of the free surface can be expressed in $$z=f(x,y)$$

where z is profile of the free surface and (x, y) is an in-plane coordinate. In this case, the micromirror 101 is required to have two DOF rotation including x-directional rotation $\theta_x$ and y-directional rotation $\theta_y$;

$$\theta_x = \frac{\partial z}{\partial x}$$
$$\theta_y = \frac{\partial z}{\partial y}$$

Because the micromirrors 101 are fabricated by microfabrication process, they are arranged on a flat plane 105. Therefore, the OPL of light ray reflected by the free surface is different from that of light ray reflected by the micromirror 101. The ΔOPL occurs due to height difference Δz between the free surface and the micromirror, which can be approximately expressed in $$\Delta OPL = 2 \times \Delta z$$

where ΔOPL is optical path length difference.

Even though the OPLs of converging light rays are different, the phase of two light rays can be matched by adjusting the ΔOPL to be m times of a wavelength of light because the phase of light is periodic, where m is an integer.

Furthermore, micromirrors in the Micromirror Array Lens can be arranged on a curved surface with a predetermined curvature such as paraboloidal surface instead of a flat plane in order to facilitate obtaining a large numerical aperture with a small rotation of the micromirrors.

Figure 11:
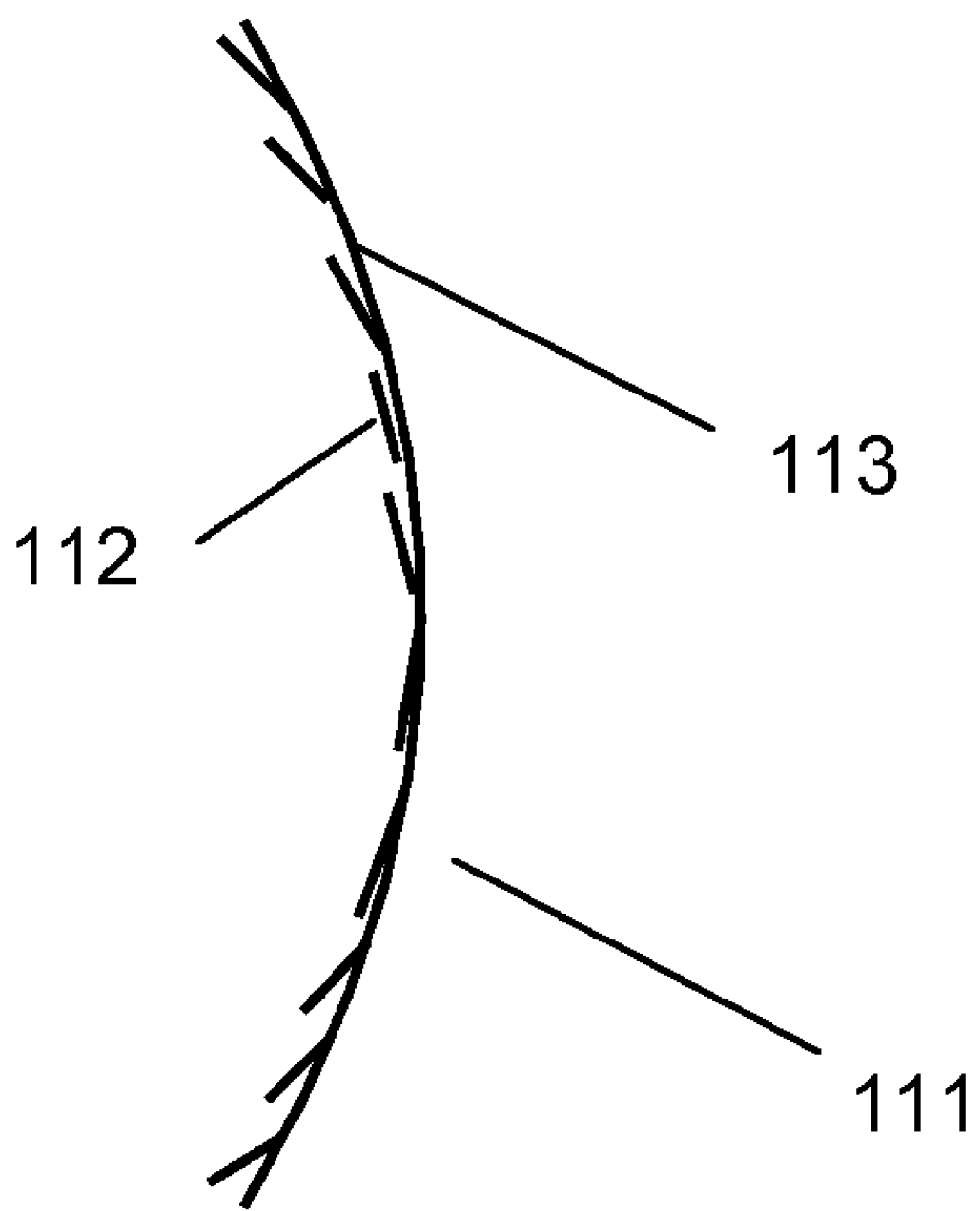
FIG. 11 shows a schematic illustration of a Micromirror Array Lens comprising micromirrors arranged on a curved surface.

FIG. 11 shows a schematic illustration of a Micromirror Array Lens 111 comprising micromirrors 112 arranged on a curved surface 113 with a predetermined focus. The Micromirror Array Lens 111 comprising the micromirrors 112 arranged on a curved surface 113 can provide a large numerical aperture lens with a small rotation of the micromirrors 112.

Each micromirror in the Micromirror Array Lens is configured to have a plurality of motions using microfabrication process. A single Micromirror Array Lens comprising these micromirrors can reproduce a plurality of free surfaces since each micromirror has a plurality of motions. When the Micromirror Array Lens reproduces a plurality of free surfaces having different focal lengths, the Micromirror Array Lens can work as a variable focal length lens providing a variable focal length. A most widely used conventional variable focal length system is the one using two refractive lenses. The conventional variable focal length system has complex driving mechanisms to control the relative positions of refractive lenses and a slow response time. The variable focal length lens using the Micromirror Array Lens, however, has a simple structure because a single Micromirror Array Lens can provide a variable optical property without macroscopic movements of multiple lenses. Also, the variable focal length lens using the Micromirror Array Lens can be mass-produced with low cost using known semiconductor microelectronics technologies such as MOS or CMOS. The Micromirror Array Lens has a variable optical property by controlling rotational and/or translational motions of the micromirrors.

Figure 12A:
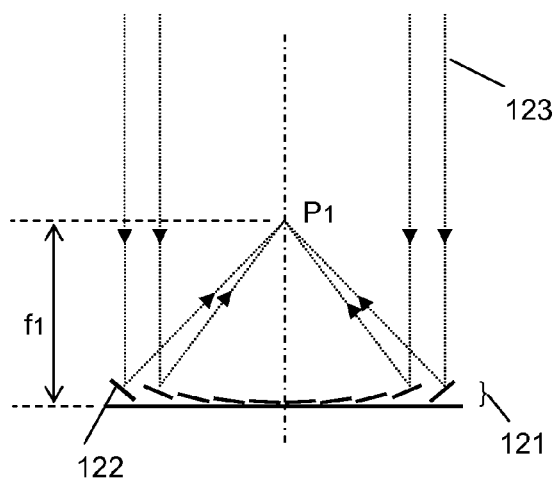
FIGS. 12A-12B show schematically how a Micromirror Array Lens works as a variable focal length lens having a variable focal length.
Figure 12B:
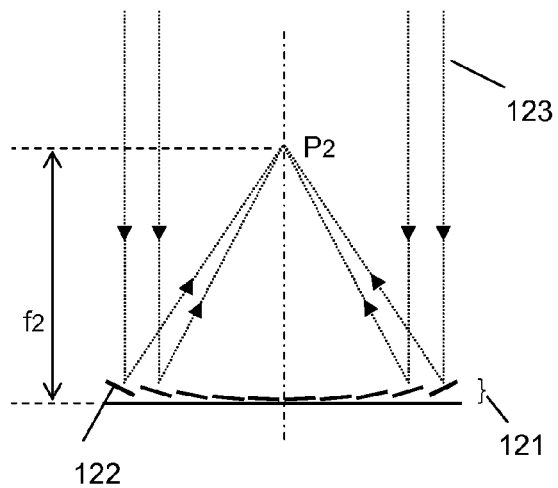

FIG. 12A and FIG. 12B show schematically how a Micromirror Array Lens 121 works as a variable focal length lens having a variable focal length. Each micromirror 122 in the Micromirror Array Lens 121 is configured to have a plurality of motions. Incident lights 123 can be focused at different focal points $P_1$ and $P_2$ by changing optical surface profiles of the Micromirror Array Lens 121.

A Micromirror Array Lens can reproduce free surfaces of various conventional reflective lenses by forming corresponding optical surface profiles that satisfies the lens conditions by controlling rotational and/or translational motions of micromirrors. The Micromirror Array Lens comprising micromirrors with two DOFs rotation and/or one translation can reproduce virtually any reflective free surface including revolution symmetric free surfaces and non-revolution symmetric free surfaces. Revolution symmetric free surfaces can be readily reproduced by the Micromirror Array Lens comprising micromirrors using one DOF rotation and/or one DOF translation. The revolution symmetric free surfaces reproduced by the Micromirror Array Lens comprising micromirrors with one DOF rotation and/or one DOF translation include various conic surfaces found in conventional reflective lenses, wherein the conic surfaces include spherical, parabolic, and other polynomial surfaces. Since the Micromirror Array Lens is a reflective optical element and usually positioned obliquely in an optical system, the Micromirror Array Lens may be required to reproduce more complicated shaped free surfaces different from those of revolution symmetric free surfaces. These non-revolution symmetric free surfaces such as line symmetry surface, anamorphic surface, and arbitrarily shaped surface are reproduced by the Micromirror Array Lens comprising micromirrors with at least one DOF rotation and/or one DOF translation. Also, some specialized optical elements can be reproduced by the Micromirror Array Lens such as optical switches, a beam steerer, a zone plate, a shutter, an iris, a multiple focal length lens, other multi-functioning optical elements, and so on.

Referring back to FIG. 9, the figure shows a schematic illustration of a Micromirror Array Lens 91 reproducing a revolution symmetric free surface. The revolution symmetric free surface can be readily reproduced by the Micromirror Array Lens 91 having a polar array of the micromirrors 92. The polar array comprising fan shape micromirrors 92 can satisfy the convergence condition of the revolution symmetric free surface by using fan shape micromirrors 92 with rotational DOF of as low as one. Use of the polar array comprising the fan shape micromirrors 92 allows the Micromirror Array Lens 91 to have simpler structure and control since it is possible to satisfy the convergence condition of revolution symmetric free surface by using only one DOF rotation of the micromirrors 92.

Especially, FIG. 9 shows a Micromirror Array Lens 91 reproducing a parabolic free surface. To satisfy the convergence condition for the parabolic surface, the micromirrors are required to have rotational DOF of as low as one. Parallel rays 93, 94 with zero degree of view angle (or scanning angle for the scanning device) is converged into one point P by the Micromirror Array Lens 91 with a parabolic surface profile. The phases of incident light can be adjusted to be the same by translating the micromirrors 92. The required translational displacement is at least half wavelength of light. The focal length f of the Micromirror Array Lens 91 is changed by varying the optical surface profile of the Micromirror Array Lens, wherein the rotation and/or the translation of the micromirrors 92 are controlled. Practical optical systems require continuous view angle (or scanning angle) in field of view (or scanning range). Therefore, the required free surface is not simple parabolic but usually expressed in polynomial functions. The optimal surface for continuous field of view (or scanning angle) can be generally found by optical simulation software. The optimal surface can be reproduced by the Micromirror Array Lens using Fresnel lens principle.

Revolution symmetric free surfaces can be reproduced by non-fan shape micromirrors as well, such as triangular, square, rectangular, or hexagonal shape micromirrors. FIG. 4 illustrates the in-plane view of a Micromirror Array Lens 41 comprising triangular shape micromirrors 42 and forming an optical surface profile 43 with a circular shape aperture. The triangular shape micromirrors 42 comprised in the optical surface profile 43 with a circular shape aperture are controlled to reproduce revolution symmetric free surfaces such as spherical, parabolic, and other polynomial surfaces. Similarly, FIG. 6 illustrates the in-plane view of a Micromirror Array Lens 61 comprising hexagonal shape micromirrors 62 and forming an optical surface profile 63 with a circular shape aperture. Similar to the Micromirror Array Lens 41 comprising the triangular shape micromirrors 42, the hexagonal shape micromirrors 62 comprised in the optical surface profile 63 with a circular shape aperture are controlled to reproduce revolution symmetric free surfaces such as spherical, parabolic, and other polynomial surfaces. In FIGS. 4 and 6, the shape, position and size of the circular optical surface profiles 43, 63 can be changed by independent control of micromirrors 42, 62. Micromirrors 44, 64 which are not elements of the optical surface profile 43, 63 with a circular shape aperture are controlled to make incident light reflected by the micromirrors 44, 64 not have influence on imaging or focusing, respectively.

Figure 13A:
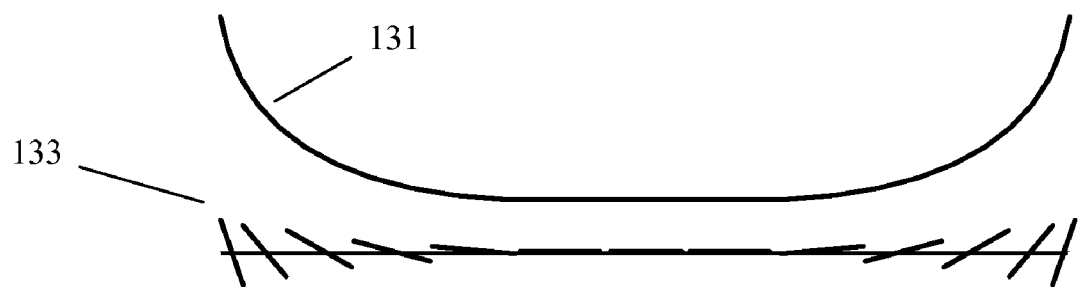
FIGS. 13A-13B show schematic illustration of Micromirror Array Lenses reproducing aspheric revolution symmetric free surfaces such as U shape free surface and W shape free surface.
Figure 13B:
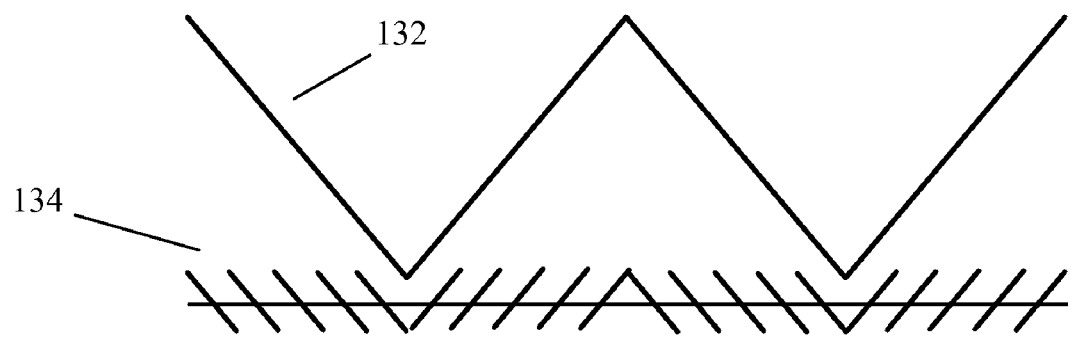

FIG. 13 shows schematic illustration of Micromirror Array Lenses 131, 132 reproducing aspheric revolution symmetric free surfaces such as U shape free surface 133 and W shape free surface 134.

Since the Micromirror Array Lens is a reflective optical element, the Micromirror Array Lens is usually positioned obliquely with respect to an optical axis of an optical system. In this case, the Micromirror Array Lens is configured to reproduce line symmetric free surfaces. A line of symmetry lies on the in-plane of the Micromirror Array Lens and is perpendicular to a tilting axis, wherein the tilting axis is perpendicular to an optical axis of an optical system.

Figure 14:
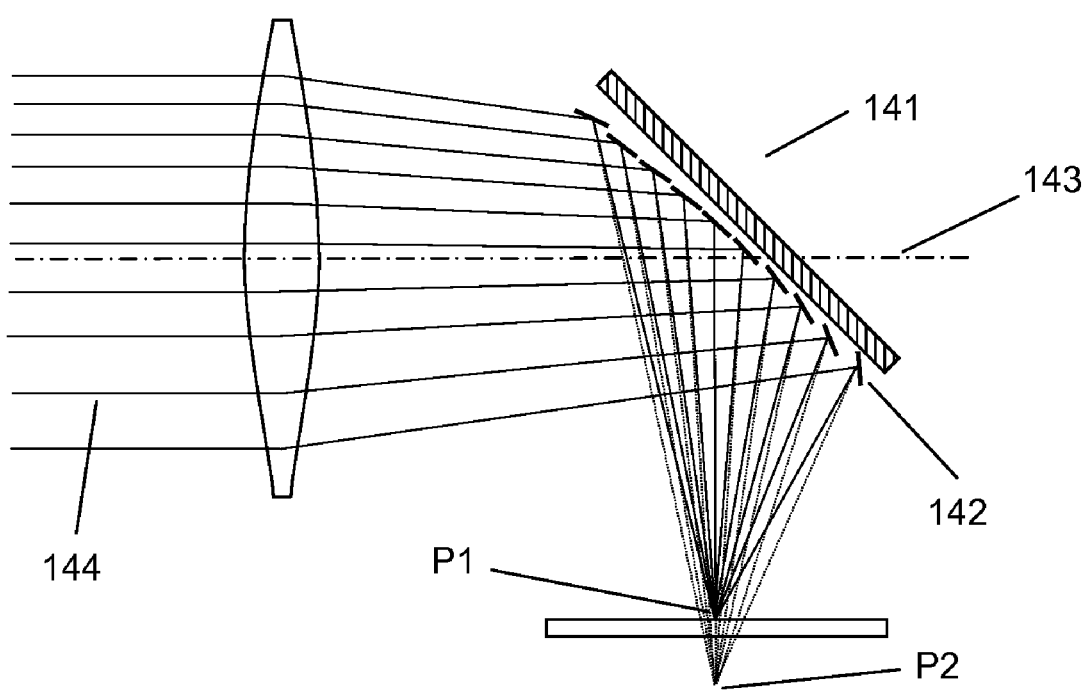
FIG. 14 shows a schematic illustration of a Micromirror Array Lens comprising micromirrors positioned obliquely with respect to an optical axis of an optical system.

FIG. 14 shows a schematic illustration of a Micromirror Array Lens 141 comprising micromirrors 142 positioned obliquely with respect to an optical axis 143 of an optical system. The reflective lens in this configuration requires a line symmetric free surface. Therefore, the Micromirror Array Lens 141 is configured to form line symmetric optical surface profiles.

Figure 15:
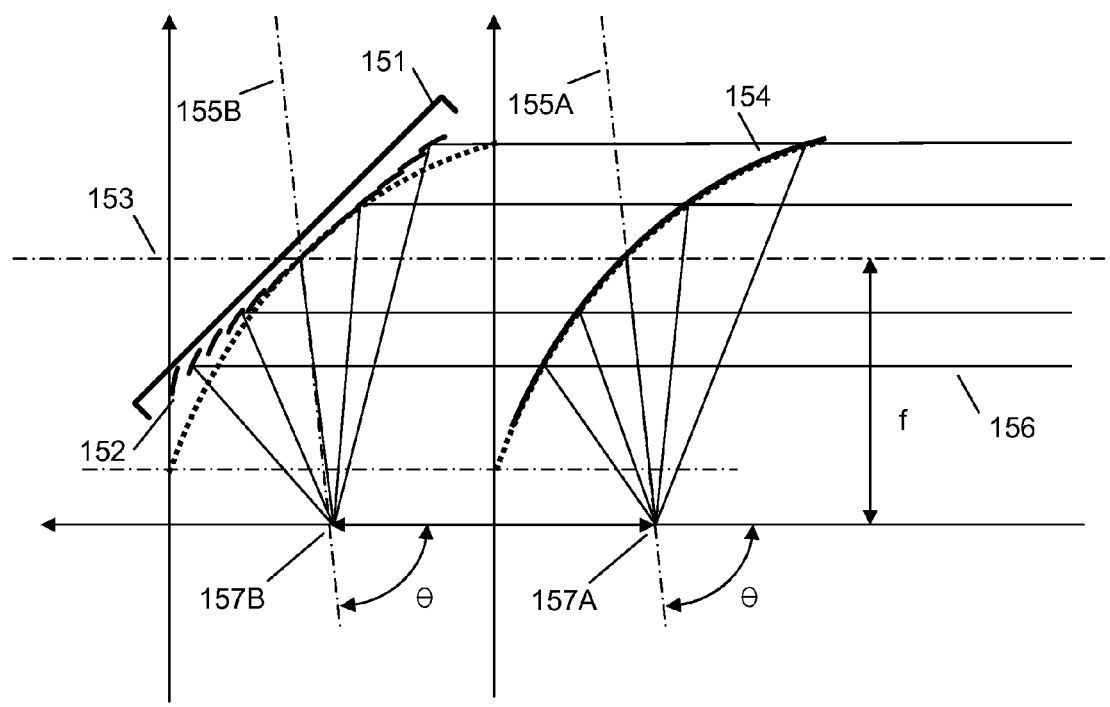
FIG. 15 shows a schematic illustration of a Micromirror Array Lens comprising micromirrors positioned obliquely with respect to an optical axis of an optical system.

FIGS. 15, 16 and 17 show examples of Micromirror Array Lenses reproducing line symmetric free surfaces.

FIG. 15 shows a schematic illustration of a Micromirror Array Lens 151 comprising micromirrors 152 positioned obliquely with respect to an optical axis 153 of an optical system. The Micromirror Array Lens 151 reproduces an off-axis parabolic free surface 154 as an example. The optical axis 153, 155A, 155B of the system is tilted with an amount of angle θ. The conventional off-axis parabolic free surface 154 makes all incident lights 156 parallel with the optical axis 153 of the paraboloid be focused into a focal point 157A. The Micromirror Array Lens 151 reproduces the off-axis parabolic free surface 154, wherein the micromirrors 152 are configured to reflect the incident light 156 into the focal point 157B as the continuous conventional paraboloid 154 does. The optical surface profile of the Micromirror Array Lens 151 is further recalibrated to satisfy the phase matching condition along with the convergence condition.

Figure 16A:
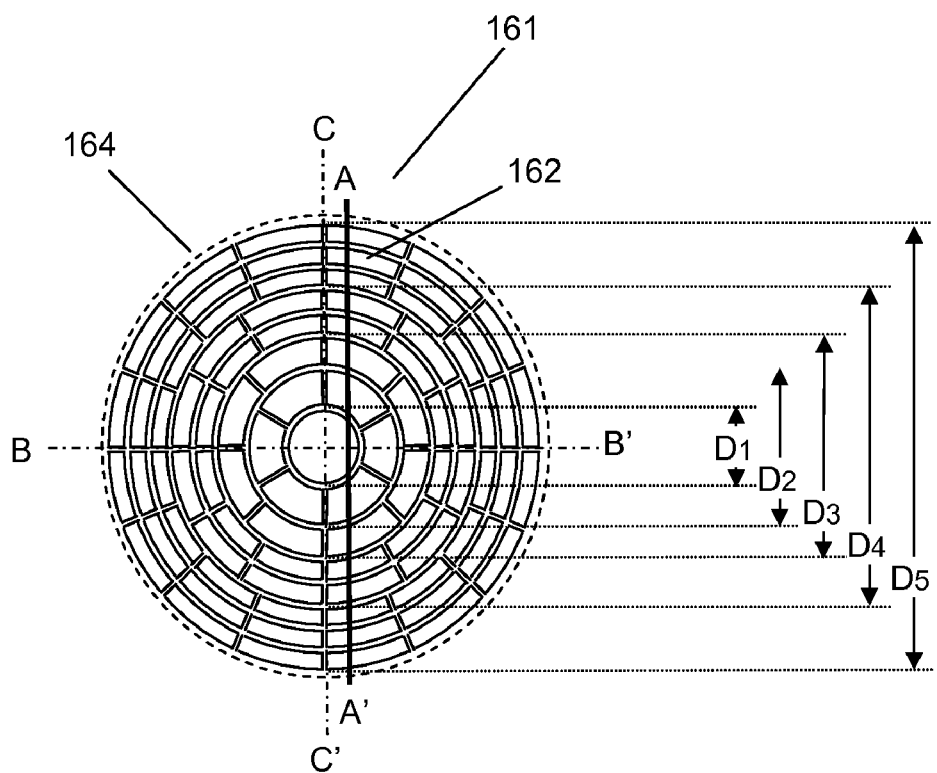
FIGS. 16A-16B show schematic cross-sectional and cut-away side views (along the line AA') of the Micromirror Array Lens obliquely positioned with respect to the optical axis of an optical system and reproducing line symmetric free surfaces with elliptical shape aperture using fan shape micromirrors
Figure 16B:
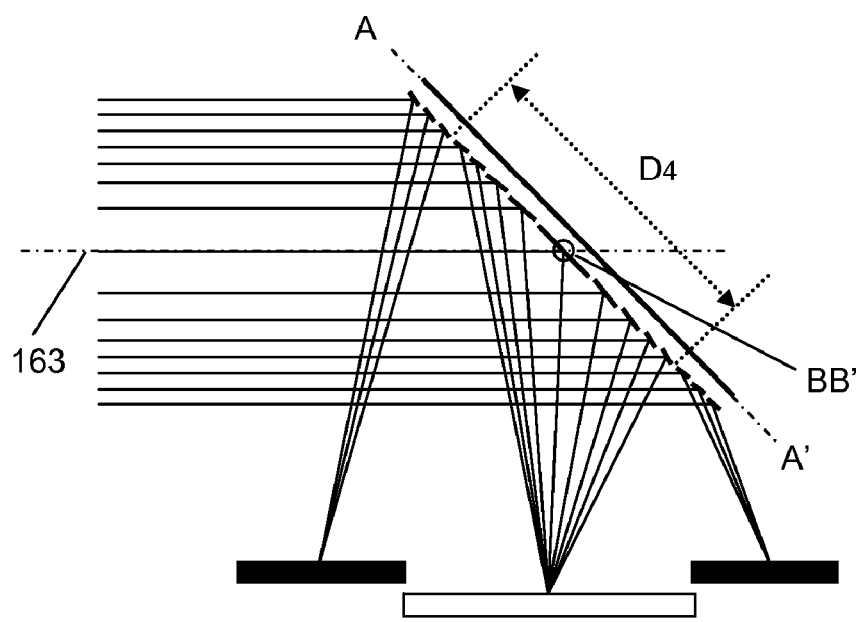

FIGS. 16A and 16B shows schematic cross-sectional and cut-away side views (along the line AA') of the Micromirror Array Lens 161 using fan shape micromirrors 162 obliquely positioned with respect to the optical axis 163 of an optical system and reproducing line symmetric free surfaces with elliptical shape aperture. The Micromirror Array Lens 161 forms optical surface profiles 164 with an elliptical shape aperture in the similar manner as explained for the example of FIG. 2. The fan shape micromirrors 162 are arranged to form one or more ellipses. The micromirrors on a ring between two consecutive concentric ellipses are controlled by a common actuating component or controlled individually by a plurality of individual actuating components by known semiconductor microelectronics technologies such as MOS or CMOS. The fan shape micromirrors 162 on the same ellipse can be controlled by a common electrode with an elliptical shape or independently controlled. A line BB' is a tilting axis of the Micromirror Array Lens 161 and perpendicular to the optical axis 163. The line of symmetry CC' lies on the plane 165 of the Micromirror Array Lens 161 and is perpendicular to the tilting axis BB'. The Micromirror Array Lens 161 can work as a variable focal length lens having a variable focal length when each micromirror 162 has a plurality of motions. Also, the Micromirror Array Lens 161 can provide a plurality of optical surface profiles having various aperture sizes D1-D5. FIG. 16B shows a cut-away side view of the optical surface profile of the Micromirror Array Lens having an aperture size D4. The Micromirror Array Lens 161 of this example facilitates to provide line symmetry optical surface profiles with elliptical shape aperture. This configuration suits best for imaging or focusing collimated beam (parallel beam).

Figures 17A, 17B:
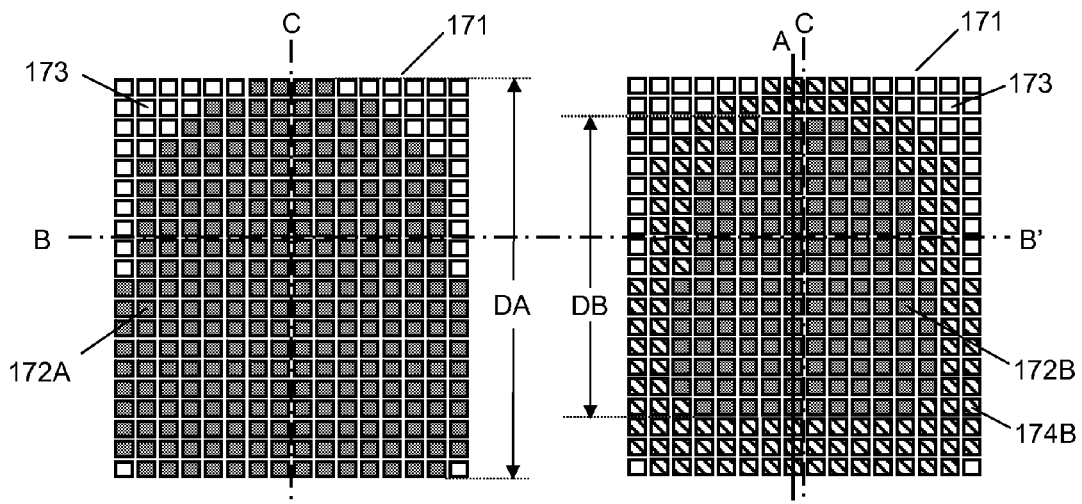
FIGS. 17A-17D show a Micromirror Array Lens reproducing line symmetric free surfaces using square shape micromirrors.
Figures 17C, 17D:
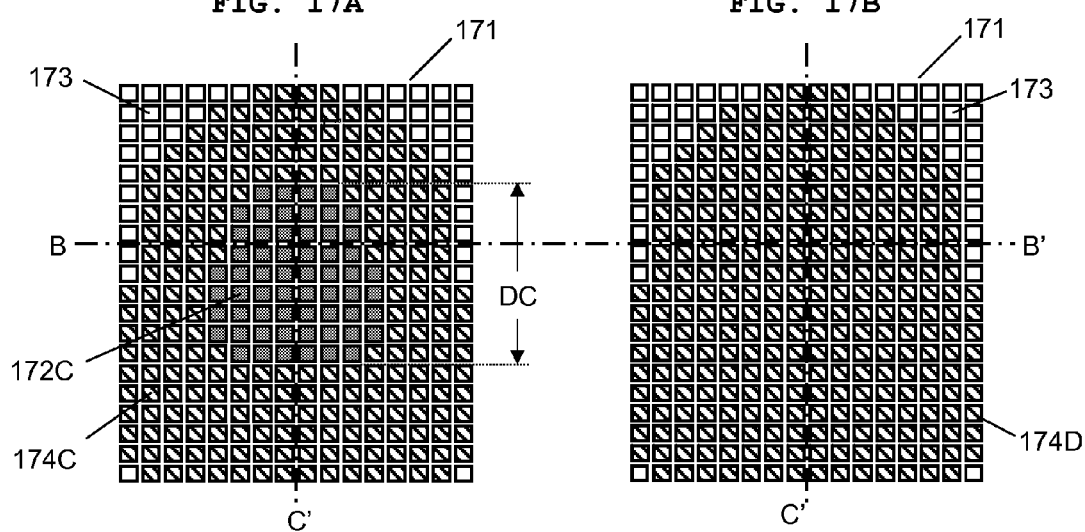

FIGS. 17A-17C shows Micromirror Array Lens 171 reproducing line symmetric free surfaces using square shape micromirrors. The shaded micromirrors 172A, 172B, and 172C are used to reproduce line symmetric free surfaces. The Micromirror Array Lens 171 reproduce free surfaces having line symmetry about a line of symmetry CC' which lies on the plane of the Micromirror Array Lens 171 and is perpendicular to the tilting axis BB'. The tilting axis BB' of the Micromirror Array Lens 171 is perpendicular to an optical axis 143 (FIG. 14). In general, each micromirror 172 is required to have two rotational DOF motions and/or one DOF translational motion to form line symmetry optical surface profiles. FIGS. 17A-17C show line symmetry optical surface profiles with different aperture sizes DA, DB, and DC. Micromirrors 173, 174B, and 174C which are not elements of the formed optical element are controlled to make incident light reflected by the micromirrors 173, 174B, and 174C have no influence on imaging or focusing.

Figure 18:
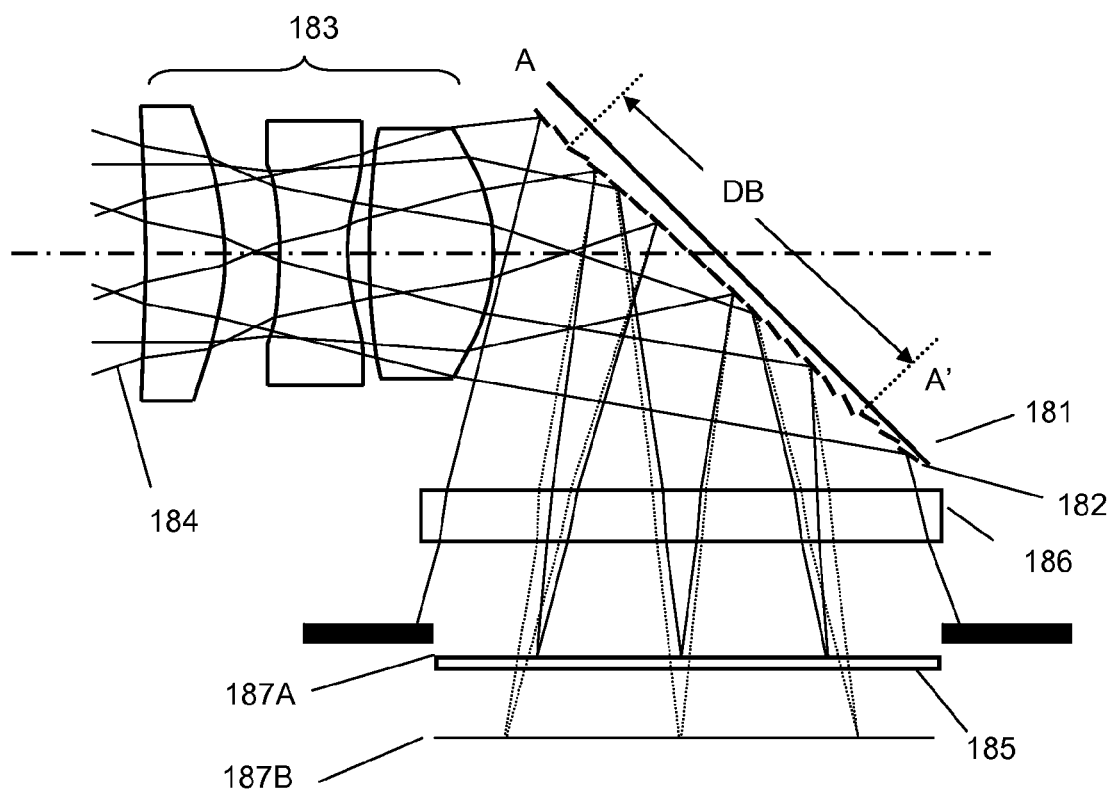
FIG. 18 shows a schematic illustration of an imaging system comprising the Micromirror Array Lens shown in FIG. 17.

FIG. 18 shows a schematic illustration of an imaging system comprising the Micromirror Array Lens 171 shown in FIG. 17. The Micromirror Array Lens 181 is a schematic cut-away side view (along the line AA' in FIG. 17B) of the Micromirror Array Lens 171 forming line symmetry optical surface profiles with aperture size DB using square shape micromirrors 182. The imaging system comprises a lens group 183 to focus incident light 184, a Micromirror Array Lens 181 to refocus the incident light 184, and an image sensor 185 to detect the incident light 184. The imaging system can further comprise an image filter 186 to enhance image quality. The Micromirror Array Lens 181 is capable of imaging or focusing the incident light 184 on different image planes 187A and 187B when each micromirror 182 in the Micromirror Array Lens 181 is configured to have a plurality of motions. Therefore, the Micromirror Array Lens 181 works as a variable focal length lens having a variable focal length.

FIGS. 3 and 5 show Micromirror Array Lenses reproducing cylindrical free surfaces as additional examples of Micromirror Array Lenses reproducing line symmetric free surface. The micromirrors with same rotation are controlled by a common electrode or controlled individually by corresponding electrodes using known semiconductor microelectronics technologies such as MOS or CMOS. The cylindrical free surfaces can be reproduced by Micromirror Array Lenses comprising triangle, square, rectangular, or hexagonal shape micromirrors.

Although some exemplary free surfaces that can be reproduced by Micromirror Array Lenses are presented, any conventional or arbitrary free surfaces can be reproduced by Micromirror Array Lenses comprising micromirrors with rotational and/or translational motion.

Since a Micromirror Array Lens can modulate incident light intensity, phase, or direction by controlling the motion of each micromirror individually, the Micromirror Array Lens is a spatial light modulator. The Micromirror Array Lens can be adapted to provide variable optical properties such as a variable focal length, a variable aberration correction, and a variable optical axis.

The Micromirror Array Lens has a variable optical property when the micromirrors have a plurality of motions. The focal length of the Micromirror Array Lens is changed by controlling rotation and/or translation of each micromirror. Referring back to FIGS. 12A and 12B, they are schematic diagrams showing a Micromirror Array Lens having a variable focal length. The Micromirror Array Lens 121 comprises a plurality of micromirrors 122. The Micromirror Array Lens 121 forms a plurality of optical surface profiles by controlling the rotation and/or translation of the micromirrors 122. Each optical surface profile has a corresponding focal length. In FIG. 12A, the Micromirror Array Lens 121 forms an optical surface profile having focal length $f_1$ by controlling the rotation and/or translation of the micromirrors 122, wherein arbitrary scattered light 123 is converged into one point $P_1$ on a focal plane. In FIG. 12B, the Micromirror Array Lens 121 forms an optical surface profile having focal length $f_2$ by controlling the rotation and/or translation of the micromirrors 122, wherein arbitrary scattered light 123 is converged into one point $P_2$ on the other focal plane. The Micromirror Array Lens 121 having a variable focal length allows an optical system using the Micromirror Array Lens 121 to have a variable effective focal length.

FIG. 14 shows another example of a Micromirror Array Lens 141 having a variable focal length, wherein the Micromirror Array Lens is positioned obliquely with respect to an optical axis 143 of an optical system. The Micromirror Array Lens 141 forms an optical surface profile focusing arbitrary scattered light 144 at one point $P_1$ on a focal plane by controlling the rotation and/or translation of the micromirrors 142. Also, the Micromirror Array Lens 141 forms an optical surface profile focusing arbitrary scattered light 144 at the other point $P_2$ on the other focal plane by controlling the rotation and/or translation of the micromirrors 142.

The Micromirror Array Lens having a variable optical property can be used in many applications such as autofocusing system, zoom system, three-dimensional imaging system, three-dimensional display system, and so on.

All the examples of Micromirror Array Lenses shown above can work as a variable focal length lens by using micromirrors having a plurality of motions.

The Micromirror Array Lens is an adaptive optical component. The Micromirror Array Lens can compensate various types of optical distortions and aberrations of an optical system by controlling each micromirror independently. The Micromirror Array Lens can correct aberration, which is caused by optical effects due to the medium between an object and its image or is caused by defects of a lens system that cause its image to deviate from the rules of paraxial imagery. Also, the Micromirror Array Lens can correct aberration caused by misalignment of lens elements yielding optical tilt. In this case, the Micromirror Array Lens makes an object which lies off the optical axis imaged without macroscopic mechanical movement. Also, the Micromirror Array Lens can resolve the aberration problems in the conventional reflective or refractive lenses. Reflective lenses are usually arranged obliquely with respect to the image. Reflective lenses are fabricated to have either complicated lens surface satisfying lens conditions or simple lens surface such as spherical surface considering production cost. While the reflective lens having the lens surface satisfying lens conditions is impractically expensive especially for most portable systems, the reflective lens having a simple lens surface yields poor image quality due to aberration. The Micromirror Array Lens can reproduce complicated free surfaces without adding extra cost and resolve the aberration problem. Also, as the size of the conventional lens increases, the cost for reducing the aberration increases exponentially. The Micromirror Array Lens can reproduce a large scale free surface without extra cost for aberration correction. Independent control of each micromirror is possible by replacing electric circuits required for control with known MOS or CMOS technologies and fabricating the circuits underneath the micromirrors using known microfabrication methods, wherein wafer-level integration of micromirrors with the microelectronics circuits is required.

Since the Micromirror Array Lens is a spatial light modulator, the Micromirror Array Lens can be configured to have a variable optical axis. The Micromirror Array Lens can change its optical axis by changing its optical surface profile. An object that does not lie on the optical axis can be imaged by the Micromirror Array Lens without any macroscopic mechanical movement of optical elements. While a variable optical axis function can be used passively in the optical system to compensate aberration caused by optical tilt or misalignment of lens elements, it can be also used actively in the optical tracking systems. The tracking system usually requires that the object be in the center of an image sensor. However, this usually requires a camera attitude control system with a macroscopic servo mechanism, which is slow and expensive to operate. In the current invention, it is possible to adjust the optical axis of the Micromirror Array Lens to place the object image in the center of the image sensor for a limited range without using a macroscopic servo mechanism. Therefore, when the Micromirror Array Lens is employed in the tracking system, it can have simple structure and light weight.

Figure 19A:
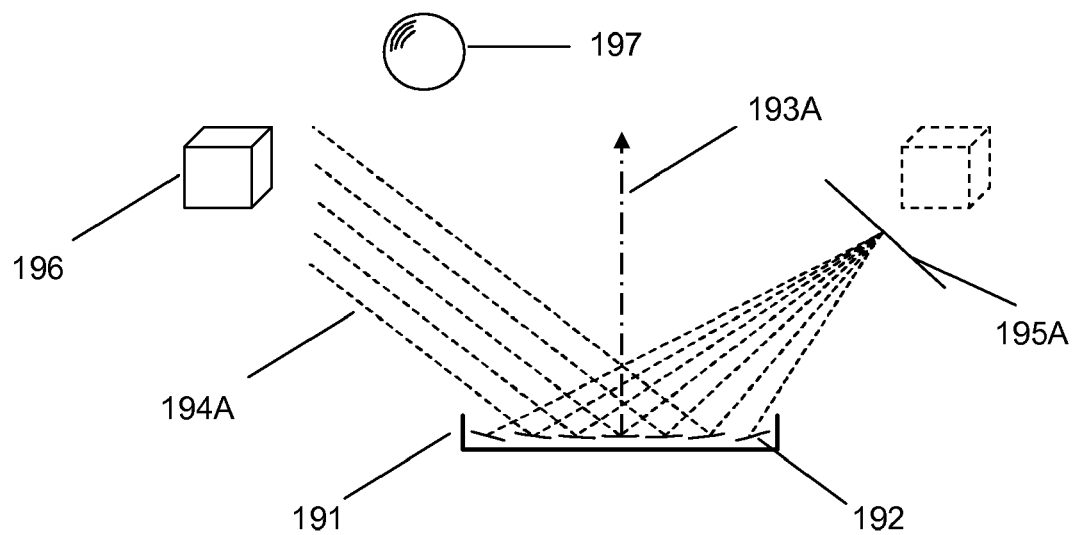
FIGS. 19A and 19B are schematic diagrams showing how a Micromirror Array Lens comprising micromirrors changes its optical axis.
Figure 19B:
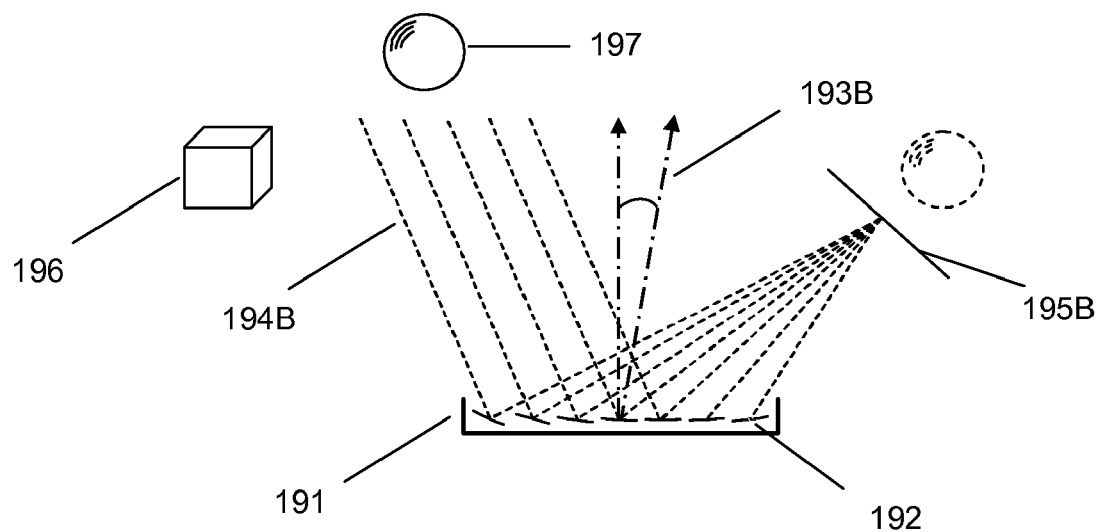

FIGS. 19A and 19B are schematic diagrams showing how a Micromirror Array Lens 191 comprising micromirrors 192 changes its optical axis 193A and 193B. The incident light 194A and 194B are focused by the Micromirror Array Lens 191. The collected beam is reflected by the surface of each micromirror 192 and then finally focused onto image plane 195A and 195B. The Micromirror Array Lens 191 can change its optical axis by changing the angles of each micromirror 192. In FIG. 19A, a cube object 196 is imaged on the image plane 195A while the optical axis 193A is maintained as the normal direction of the Micromirror Array Lens 191. Also in FIG. 19B, a sphere object 197 is imaged on the image plane 195B with a tilted optical axis 193B. The Micromirror Array Lens 191 changes its optical axis without macroscopic movement of the Micromirror Array Lens 191.

The same phase condition satisfied by the Micromirror Array Lens contains an assumption of monochromatic light. Therefore, to get a color image, the Micromirror Array Lens is controlled to satisfy the same phase condition for each wavelength of Red, Green, and Blue (RGB), respectively, and the imaging system can use bandpass filters to make monochromatic lights with wavelengths of Red, Green, and Blue (RGB). If a color photoelectric sensor is used as an imaging sensor in the imaging system using a Micromirror Array Lens, a color image can be obtained by processing electrical signals from Red, Green, and Blue (RGB) imaging sensors with or without bandpass filters, which should be synchronized with the control of the Micromirror Array Lens. To image Red light scattered from an object, the Micromirror Array Lens is controlled to satisfy the phase condition for Red light. During the operation, Red, Green, and Blue imaging sensors measure the intensity of each Red, Green, and Blue light scattered from an object. Among them, only the intensity of Red light is stored as image data because only Red light is imaged properly. To image each Green or Blue light, the Micromirror Array Lens and each imaging sensor works in the same manner as the process for the Red light. Therefore, the Micromirror Array Lens is synchronized with Red, Green, and Blue imaging sensors. Alternatively, the same phase condition for a color image is satisfied by using the least common multiple of wavelengths of Red, Green, and Blue lights as an effective wavelength for the phase condition. In this case, the Micromirror Array Lens is not necessary to be controlled to satisfy the phase condition for each Red, Green, and Blue light individually. Instead, the phase condition for the least common multiple of the wavelengths should be satisfied. For the simpler control, the translation of each micromirror is only controlled to satisfy the phase condition for one light among Red, Green, and Blue lights or is not controlled to satisfy the phase condition for any other lights of Red, Green, and Blue. Even though the Micromirror Array Lens cannot satisfy the phase condition due to phase error of lights with multi-wavelength, still the lens can be used as a variable focal length lens with low image quality.

The Micromirror Array Lens is controlled to compensate for chromatic aberration by satisfying the same phase condition for each wavelength of Red, Green, and Blue (RGB) or Yellow, Cyan, and Magenta (YCM), respectively, to get a color image. The optical system of the Micromirror Array Lens may further include a plurality of bandpass filters for color imaging. Also, the optical system may further include a photoelectric sensor. The photoelectric sensor includes Red, Green, and Blue (RGB) or Yellow, Cyan, and Magenta (YCM) sensors. A color image is obtained by treatment of electrical signals from the corresponding colored sensors. The treatment of electrical signals from corresponding colored sensors is synchronized and/or matched with the control of the Micromirror Array Lens to satisfy the same phase condition for each wavelength respectively. Instead of satisfying three different wavelength phase matching condition, the Micromirror Array Lens can be controlled to satisfy phase matching condition at an optimal wavelength to minimize chromatic aberration. Even though the image quality of color is not perfect, this optimal wavelength phase matching can also be used for getting a color image.

The Micromirror Array Lens has high versatility as described above, thus it can work as various optical elements. Beside functions as a variable focal length lens and/or a variable optical axis aforementioned, the Micromirror Array Lens can function as a fixed focal length lens, an array of optical switches, a beam steerer, a zone plate, a shutter, an iris, a multiple focal length lens, other multi-functioning optical elements, and so on.

The Micromirror Array Lens can have a fixed optical surface profile to provide a fixed focal length. The Micromirror Array Lens is fabricated to have a fixed optical surface profile using surface profile shape memory technique. No matter how complicated the designed free surface is, it can be easily formed in a Micromirror Array Lens and simply fabricated by the mass production process. The fixed focal length Micromirror Array Lens replaces various conventional reflective lenses with low cost. Also, the fixed focal length Micromirror Array Lens can be fabricated to reproduce various complicated free surfaces that can be difficult to make or very expensive to produce.

A single Micromirror Array Lens can be configured to provide multiple focal lengths at one time.

Figure 20:
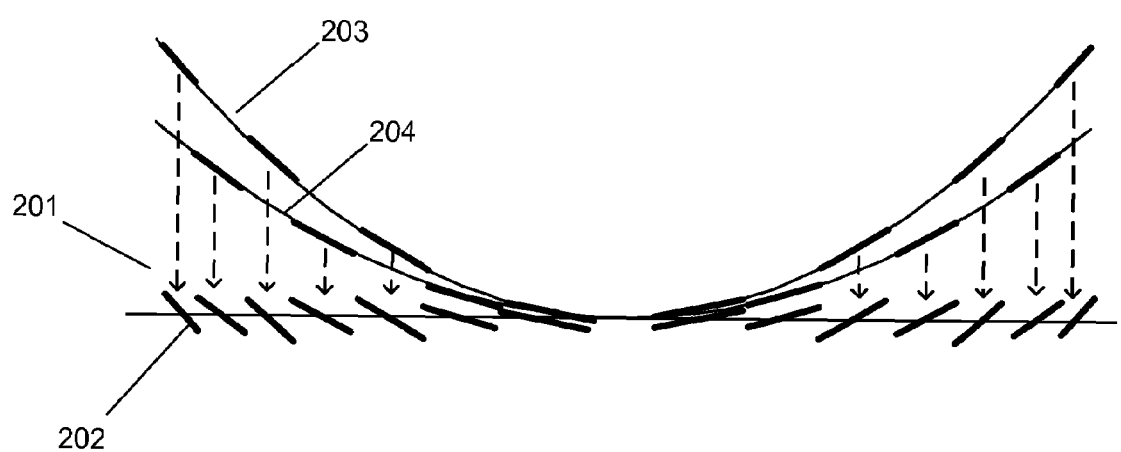
FIG. 20 shows a schematic illustration of a dual focal length Micromirror Array Lens comprising micromirrors as an exemplary multiple focal length lenses.

FIG. 20 shows a schematic illustration of a dual focal length Micromirror Array Lens 201 comprising micromirrors 202 as an exemplary multiple focal length lenses. Two free surfaces 203, 204 with different focal lengths are reproduced in one Micromirror Array Lens 201 at one time.

The Micromirror Array Lens comprising micromirrors with one DOF translation can work as a zone plate as described above. The zone plate comprises a plurality of zones, wherein each of the zones are a concentric ring comprising at least one micromirror and un-overlapped with the other zones. The micromirrors are arranged so that the zones has the same area and ΔOPL between an OPL from one zone to a focal point and the other OPL from its adjacent zone to the focal point is half wavelength of light, wherein the micromirrors in every other zone are translated to compensate half wavelength phase difference between two adjacent zones, wherein the area of the zones is determined by a focal length of the zone plate. The micromirrors in every other zone are translated to compensate half wavelength phase difference between two adjacent zones. The zone plate using a Micromirror Array Lens can be a variable focal length lens having a variable focal length, wherein the focal length of the zone plate is changed by re-zoning of the micromirrors, wherein the focal length determines the area of the zones. On the other hand, each of the micromirrors can be configured to have a plurality of translational motions and controlled to form the zone plates for a plurality of wavelengths of light, wherein the wavelength of the light determines the area of the zones.

Figures 21A, 21B:
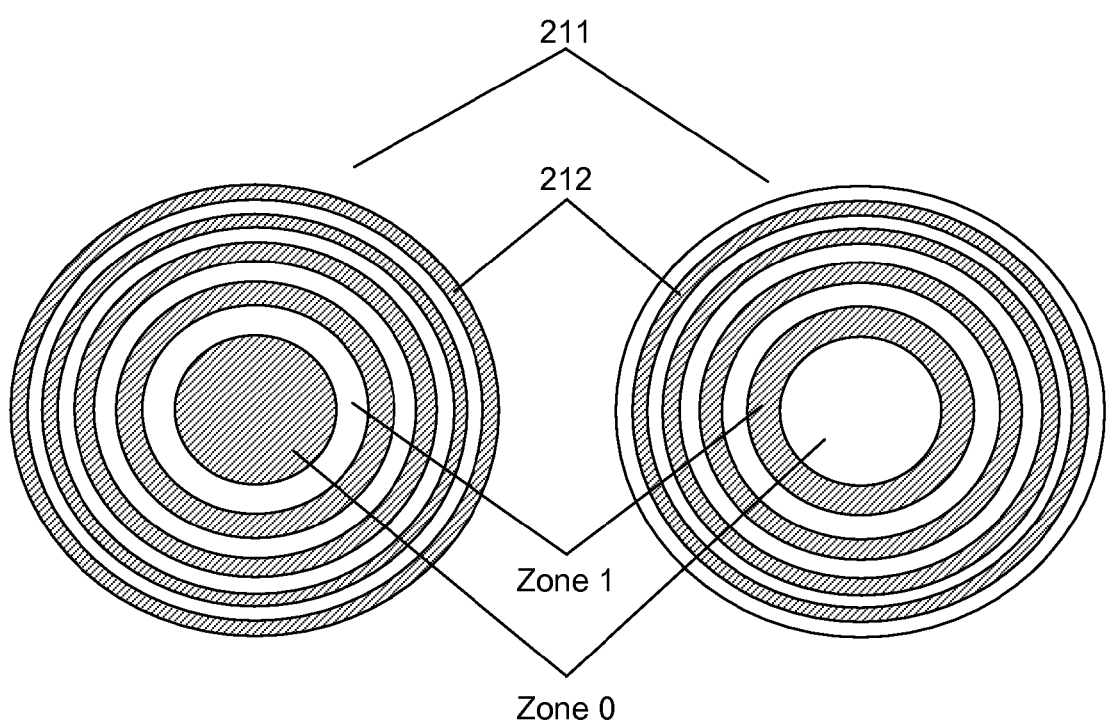
FIGS. 21A and 21B illustrate conventional zone plates.

FIGS. 21A and 21B illustrate conventional zone plates 211. Gray regions (zones) 212 are the area where incident light is blocked. The incident Light is blocked at even zones in the zone plate of FIG. 21A and at odd zones in the zone plate of FIG. 21B. All zones are configured to have the same area and ΔOPL between an OPL from one zone to a focal point and other OPL from its adjacent zone to the focal point is configured to be half wavelength of light. Two zone plates provide an identical focal point and light intensity. Focal length of the zone plate can be determined by the area of zones.

Figures 22A, 22B:
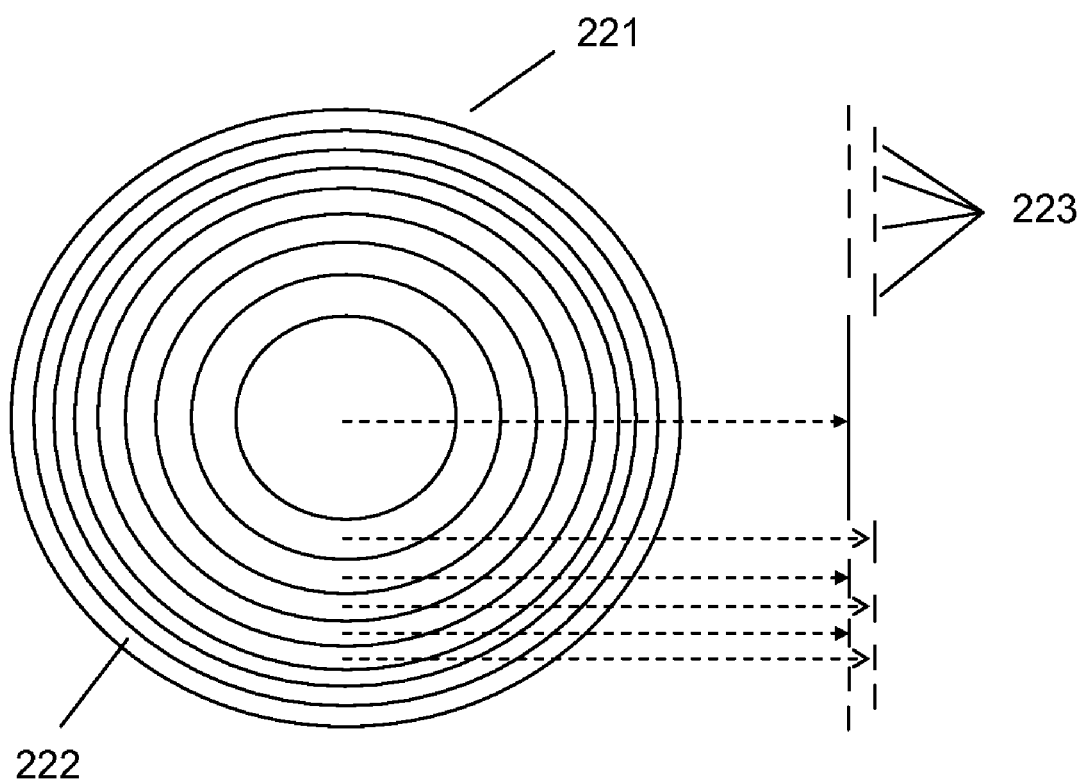
FIGS. 22A and 22B show a schematic illustration of a zone plate using a Micromirror Array Lens.

FIGS. 22A and 22B shows a schematic illustration of a zone plate using a Micromirror Array Lens 221. The Micromirror Array Lens 221 comprises a plurality of micromirrors 222 with pure translation and form a plurality of zones. Each zone comprises at least one micromirror 222. To compensate half wavelength phase difference between two zones, the odd zone 223 is translated. The whole surface comprises micromirrors 222 which can be translated along the out of plane direction of the Micromirror Array Lens 221. Because the micromirrors 222 reflect light, required translation distance of each micromirror 222 is quarter wavelength of light to make half wavelength phase difference. By fine control of the translational motion of each micromirror 222, more improved image can be obtained.

Figure 23:
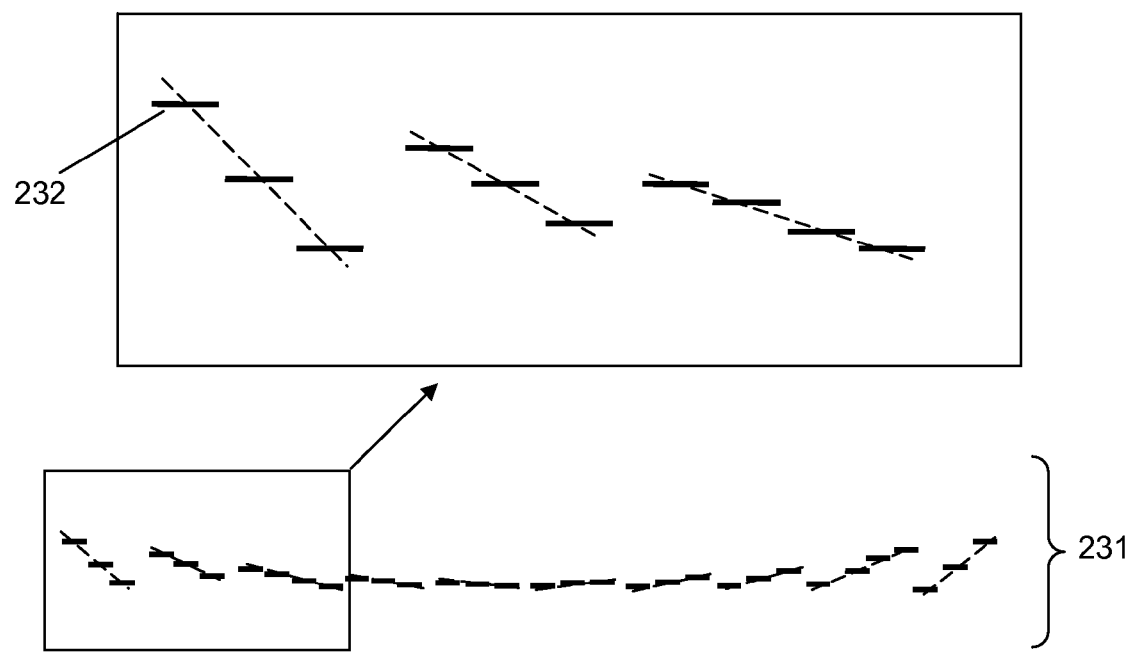
FIG. 23 shows a schematic illustration of a zone plate with fine control of translational motions of micromirrors.

FIG. 23 shows a schematic illustration of a zone plate 231 with fine control of translational motions of micromirrors 232. Along the radial axis of the zone plate 231, each zone contains several micromirrors 232. Since the phase variation in a zone for conventional zone plates 211 (FIG. 21) is μ radian, the aberration of conventional zone plates 211 (FIG. 21) is very large. If the size of each micromirror 232 is selected more precisely, the aberration of the zone plate 231 can be decreased.

Since each micromirror can have a plurality of motions and be controlled individually, the Micromirror Array Lens can work as more than a simple lens.

The micromirrors in the Micromirror Array Lens can be used as optical switches, wherein the micromirrors at the on status reflect incident light onto an area of interest such as screen and image sensor and the micromirrors at the off status reflect the incident light out of the area of interest. Micromirrors in conventional micromirror devices have been used as optical switches but each micromirror has only two positions including on and off positions. When the micromirrors in the conventional micromirror devices change their statuses, some light traversal patterns may occur on an image due to repeated light traverses over the same direction. To avoid this problem, the micromirrors of the present invention can be configured to reflect the incident light to a plurality of directions out of the area of interest at the off status since each micromirror can have a plurality of motions.

The Micromirror Array Lens can be used as a beam steerer. The Micromirror Array Lens can focus incident light and steer the focused beam across an area of interest by controlling motions of the micromirrors. The Micromirror Array Lens can be used as the beam steerer for scanners, printers, projectors, and so forth.

The Micromirror Array Lens can be used as an optical shutter. While conventional optical shutters block or attenuate incident light, the optical shutter of the present invention does not uses beam blocks or attenuators. The Micromirror Array Lens reflects the incident light out of the area of interest such an image sensor to block the incident light by controlling motions of the micromirrors when the shutter is on while the Micromirror Array Lens reflects the incident light onto the image sensor by controlling motions of the micromirrors when the shutter is off.

Figure 24A:
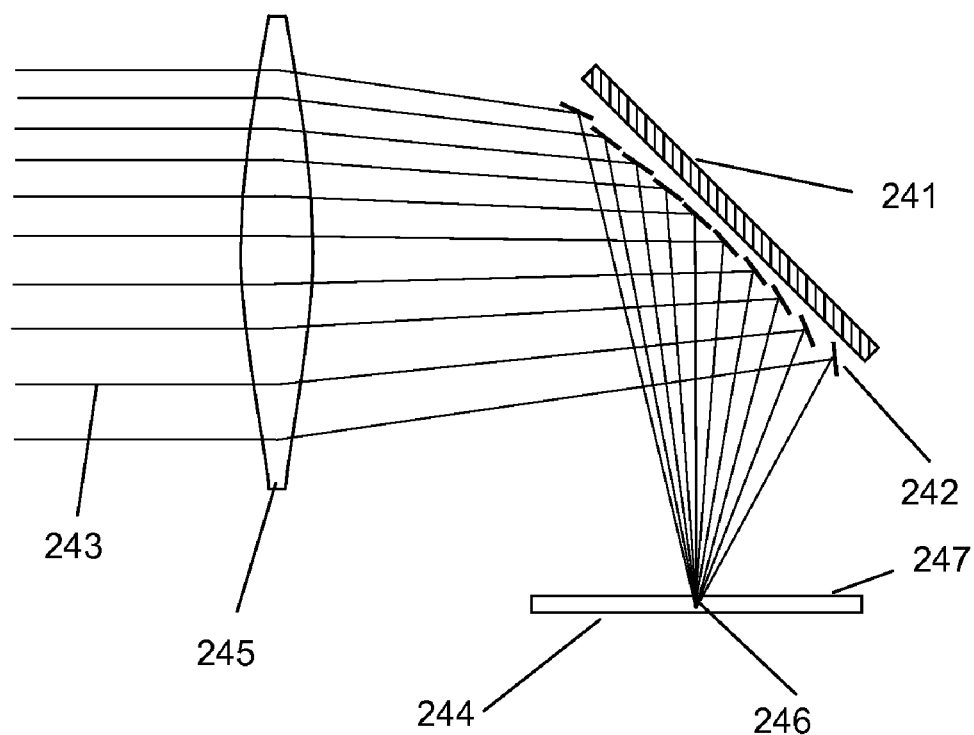
FIGS. 24A-24B show schematically how an optical shutter with a Micromirror Array Lens comprising micromirrors works.
Figure 24B:
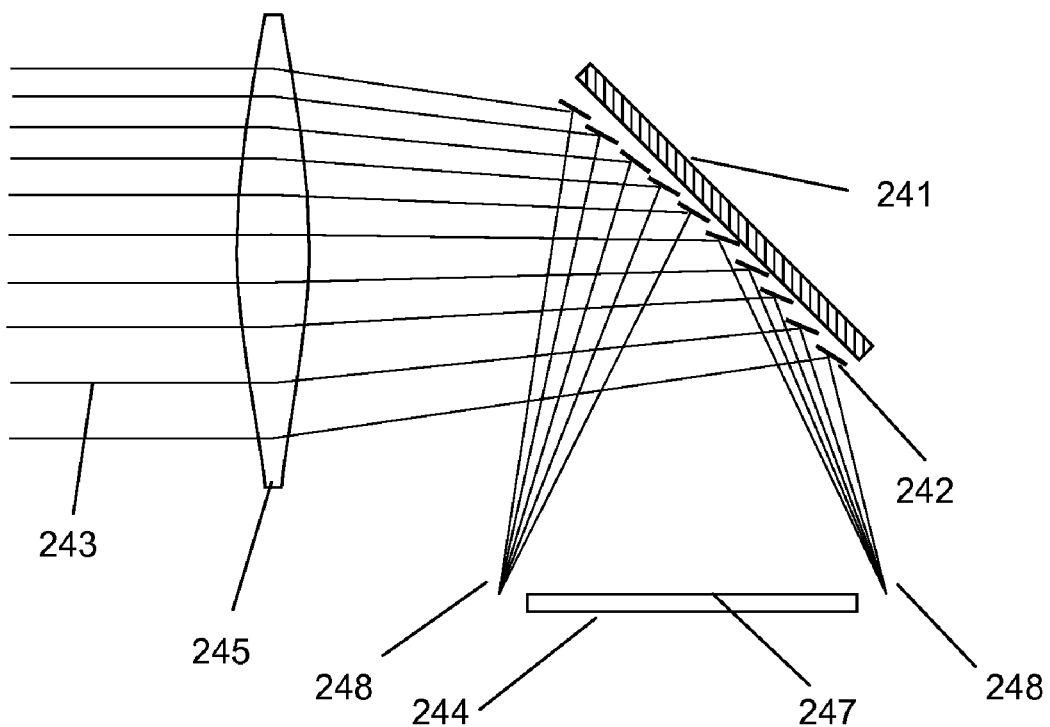

FIGS. 24A and 24B show schematically how an optical shutter with a Micromirror Array Lens 241 comprising micromirrors 242 works. The Micromirror Array Lens 241 reflects incident light 243 out of the image sensor 244 to block the incident light 243 by controlling motions of the micromirrors 242 when the shutter is on while the Micromirror Array Lens 241 reflects the incident light 243 onto the image sensor 244 by controlling motions of the micromirrors 242 when the shutter is off.

Also, the Micromirror Array Lens can be used as multi-functional optical elements. As an example, the Micromirror Array Lens can provide both lens function and shutter function to an imaging system. The Micromirror Array Lens is configured to focus the incident light an image sensor to image when the shutter function is off and redirect the incident light out of the image sensor to block the incident light when the shutter is on.

FIGS. 24A and 24B show a schematic illustration of a Micromirror Array Lens 241 having both lens function and shutter function. In FIG. 24A, incident light 243 is converged onto an image sensor plane 244. The incident light 243 is first focused by an auxiliary lens 245 and then focused again by the Micromirror Array Lens 241. In the Micromirror Array Lens 241, the micromirrors 242 change their angles to make a focus 246 on the image plane 247. On the contrary, in FIG. 24B, the incident light 243 is reflected by the micromirrors 242 and redirected out of the image sensor plane 244. The redirected incident light is reflected to the places 248 where the image sensor 243 is not present.

Furthermore, the Micromirror Array Lens can have a reflective Fresnel lens function having a variable optical property as well as shutter function. The Micromirror Array Lens forms a plurality of optical surface profiles by controlling motions of the micromirrors when the shutter function is off as shown in FIG. 14 while the Micromirror Array Lens redirects the incident light out of the image sensor to block the incident light when the shutter is on.

The Micromirror Array Lens can be used as an iris device. The iris device changes its aperture size to regulate an amount of light admitted to an area of interest such as an image sensor. The Micromirror Array Lens with iris function of the present invention comprises a plurality of micromirrors and is configured to provide an adjustable aperture having a plurality of aperture sizes by controlling motions of the micromirrors. The adjustable aperture controls the amount of incident light admitted to the image sensor by changing the aperture size.

Figure 25A:
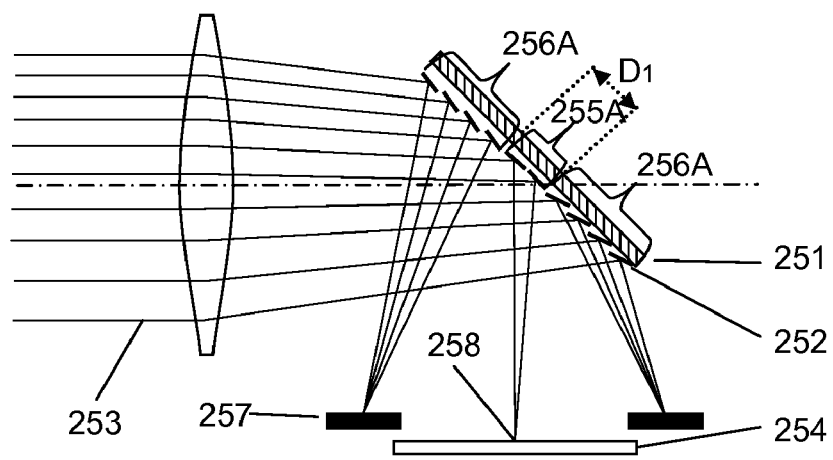
FIGS. 25A-25C are schematic cross-sectional views of an example of a Micromirror Array Lens with iris function.
Figure 25B:
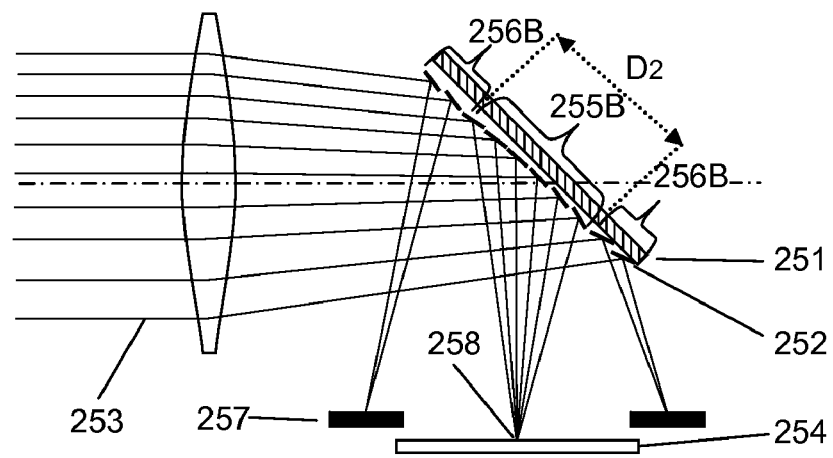
Figure 25C:
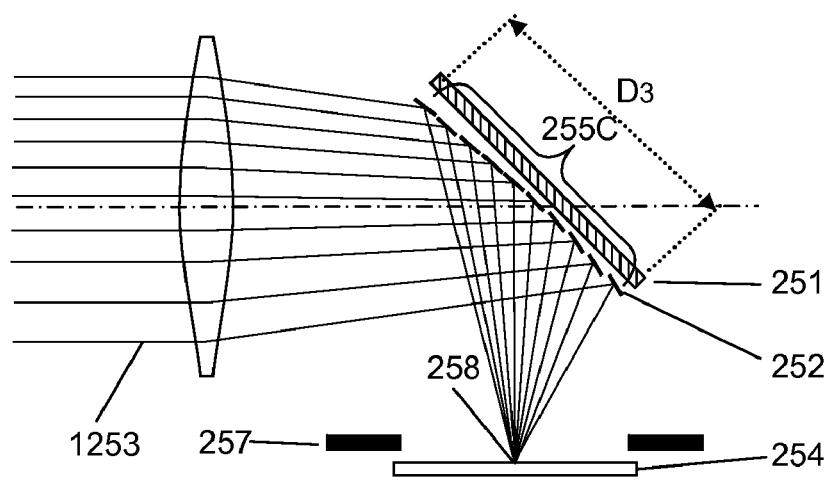

FIGS. 25A-25C are schematic cross-sectional views of an example of a Micromirror Array Lens 251 with iris function. The Micromirror Array Lens 251 with iris function comprises a plurality of micromirrors 252 and is configured to provide an adjustable aperture having a plurality of aperture sizes by controlling motions of the micromirrors 252. Although FIGS. 25A-25C show only three different aperture sizes $D_1$, $D_2$, and $D_3$ for simpler illustration, the Micromirror Array Lens 251 with iris function of the present invention can provide virtually any required number of aperture sizes. The adjustable aperture controls the amount of incident light 253 admitted to an image sensor 254 by changing the aperture size $D_1$, $D_2$, and $D_3$.

In operation, two groups of micromirrors 252 are selected from the Micromirror Array Lens 251 for each aperture size to provide the adjustable aperture. One group of micromirrors 252 are active micromirrors 255A, 255B, and 255C forming an aperture. The other group of micromirrors 252 is inactive micromirrors 256A and 256B located out of the aperture formed by the active micromirrors 255A and 255B, respectively. Note that in FIG. 25C, the Micromirror Array Lens 251 providing a full aperture size (the largest aperture area) $D_3$ does not have inactive micromirrors. However, some Micromirror Array Lenses at the full aperture size may have redundant micromirrors 173 (FIG. 17A) that are inactive for all aperture sizes as shown in FIG. 17A. Whether the Micromirror Array Lens 251 at the full aperture size has inactive micromirrors depends on the shape of the Micromirror Array Lens 251.

The active micromirrors 255A, 255B, and 255C for each aperture size are controlled to reflect incident light 253 onto the image sensor 254 while the inactive micromirrors 256A and 256B are controlled to reflect the incident light 253 out of the image sensor 254. A group of the active micromirrors comprised in each aperture size can be predetermined. By simply changing the group of the active micromirrors, the aperture size can be changed discretely.

The micromirror array with iris function 251 can further comprise at least one optical block 257 to absorb incident light 253 reflected by the inactive micromirrors 256A and 256B.

Each micromirror 252 is configured to have a plurality of motions to provide adjustable aperture of the micromirror array, wherein at least one motion is required for the active status and another at least one motion is required for the inactive status. Each micromirror can be configured to have a plurality of motions for both active status and inactive status.

Referring back to FIGS. 17A-17D, they show a Micromirror Array Lens 171 providing an adjustable aperture having line symmetry using square shaped micromirrors. The Micromirror Array Lens 171 provides the adjustable aperture having a plurality of aperture sizes DA-DC. The active micromirrors 172A, 172B and 172C are controlled to reflect incident light onto the image sensor while the inactive micromirrors 173, 174B, 174C, and 174D are controlled to reflect the incident light out of the image sensor.

As another example for multi-functional optical elements, the Micromirror Array Lens can provide both reflective Fresnel lens function and iris function to an imaging system. The active micromirrors are configured to form a reflective Fresnel lens having at least one optical surface profile by controlling motions of the active micromirrors while the inactive micromirrors are configured to reflect incident light out of the image sensor. Furthermore, the Micromirror Array Lens for each aperture size can have a variable optical property with a variable focal length and/or a variable optical axis as well as shutter function.

Referring back to FIG. 18, the Micromirror Array Lens 181 can have both lens function and iris function, wherein the Micromirror Array Lens 181 forms a plurality of optical surface profile by controlling motions of the micromirrors 182 when the shutter function is off while the Micromirror Array Lens 181 redirects the incident light 183 out of the image sensor 185 to block the incident light 183 when the shutter is on. The Micromirror Array Lens for each aperture size can have a variable optical property with a variable focal length and/or a variable optical axis. FIG. 18 shows two different focal planes 187A and 187B. Furthermore, the Micromirror Array Lens 181 has a shutter function as well by simply redirecting the incident light out of the image sensor when the shutter function is on as shown in FIG. 24B.

Figure 26A:
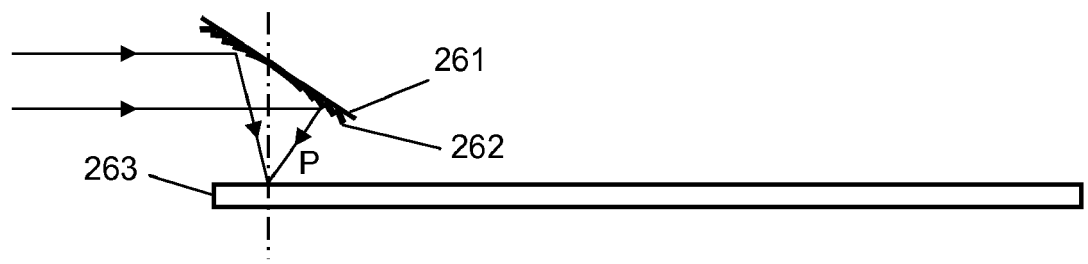
FIGS. 26A and 26B show a schematic illustration of a Micromirror Array Lens having a variable focal length, and a variable optical axis, and a variable aberration correction functions all together.
Figure 26B:
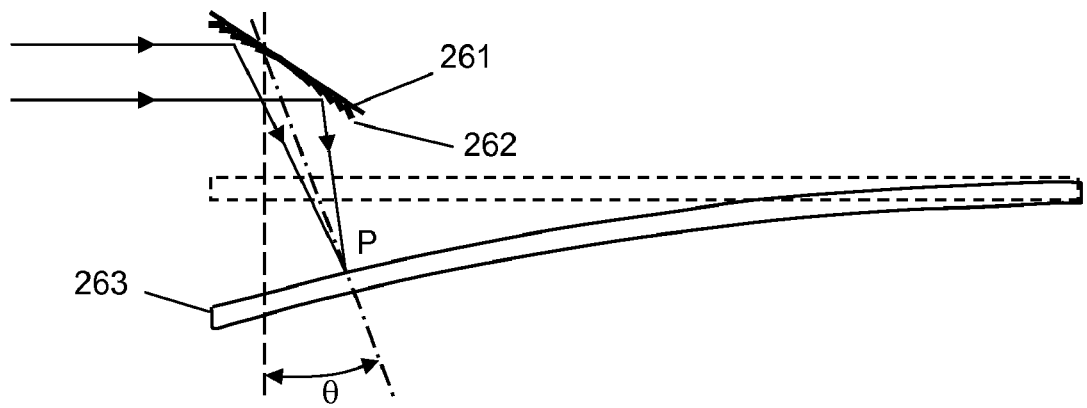

A Micromirror Array Lens can be configured to have a variable focal length, and a variable optical axis, and a variable aberration correction all together at one single optical system. FIGS. 26A and 26B show a schematic illustration of a Micromirror Array Lens 261 having a variable focal length, and a variable optical axis, and a variable aberration correction functions all together. The Micromirror Array Lens 261 comprising micromirrors 262 is applied to an optical pick-up system in order to focus light from a light source, trace tracks of an optical disc, and compensate for tilt and deflection of the optical disc 263 occurring during the operation. When a tilt and/or mechanical deflection of an optical disc 263 occur, the Micromirror Array Lens 261 can maintain the focus at the point P on the optical disc by changing its focal length and optical axis and correct various aberrations caused by tilt and deflection of the optical disc 263 by controlling motions of micromirrors. Thus, with no macroscopic motions of lens elements, the Micromirror Array Lens 261 can compensate for a focusing error, a tracking error, and aberration caused by tilt and/or mechanical deflection. These features can be advantageously used in the optical pick-up system, image stabilizer, tracking system, and so on.

Figure 27:
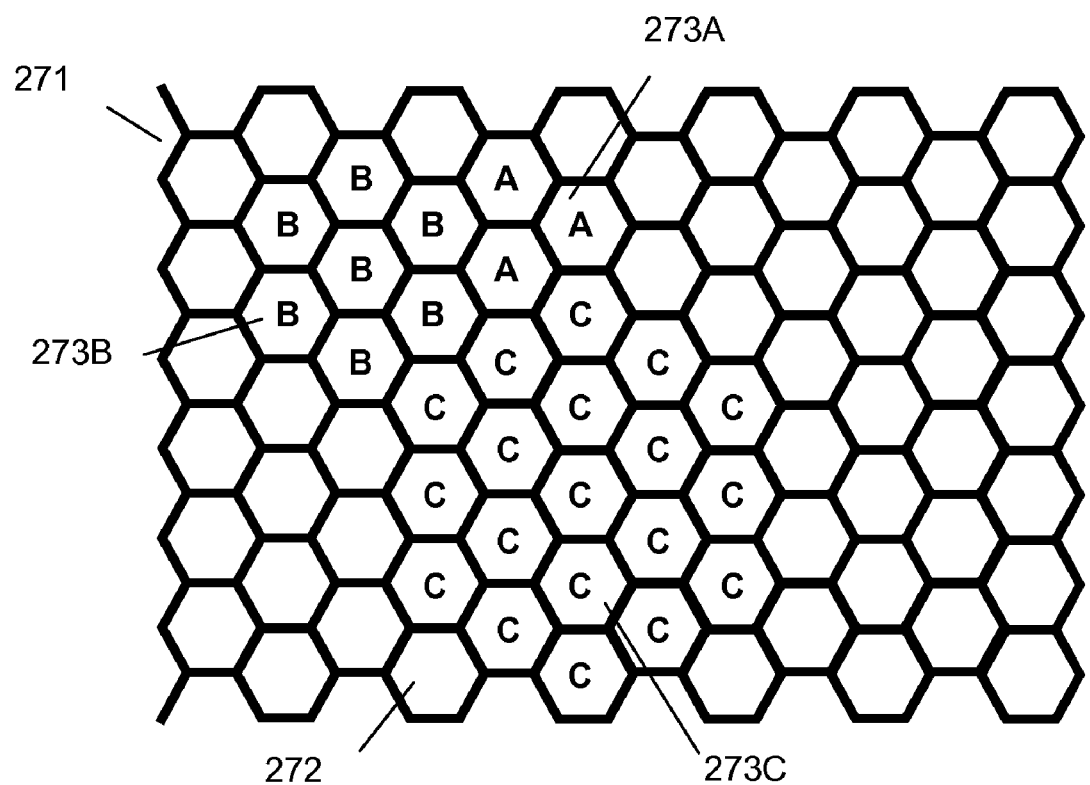
FIG. 27 shows a schematic illustration of a Micromirror Array Lens reproducing a plurality of free surfaces at one time.

The Micromirror Array Lens can reproduce a plurality of free surfaces at one time. As shown in FIG. 27, a Micromirror Array Lens 271 comprising a plurality of micromirrors 272 can be configured to form a plurality of optical surface profiles simultaneously. Each optical surface profile works as a lens 273A, 273B, and 273C. The size, position, and optical surface profile of lenses 273A, 273B, and 273C formed in a single Micromirror Array Lens 271 at one time can be varied according to the required specification. Each lens 273A, 273B, and 273C formed in the Micromirror Array Lens 273 can have a variable optical property when each micromirror 272 is configured to have a plurality of motions. In this case, each lens 273A, 273B, and 273C works independently for focusing and imaging. These features can be advantageously used in beam focusing, scanning, projection, or tracking systems. Since multiple lenses 273A, 273B, and 273C works simultaneously without macroscopic movement of lens elements, the optical system can be more effective in time and cost. Also, the optical system using the Micromirror Array Lens has a simple and compact structure.

Figure 28:
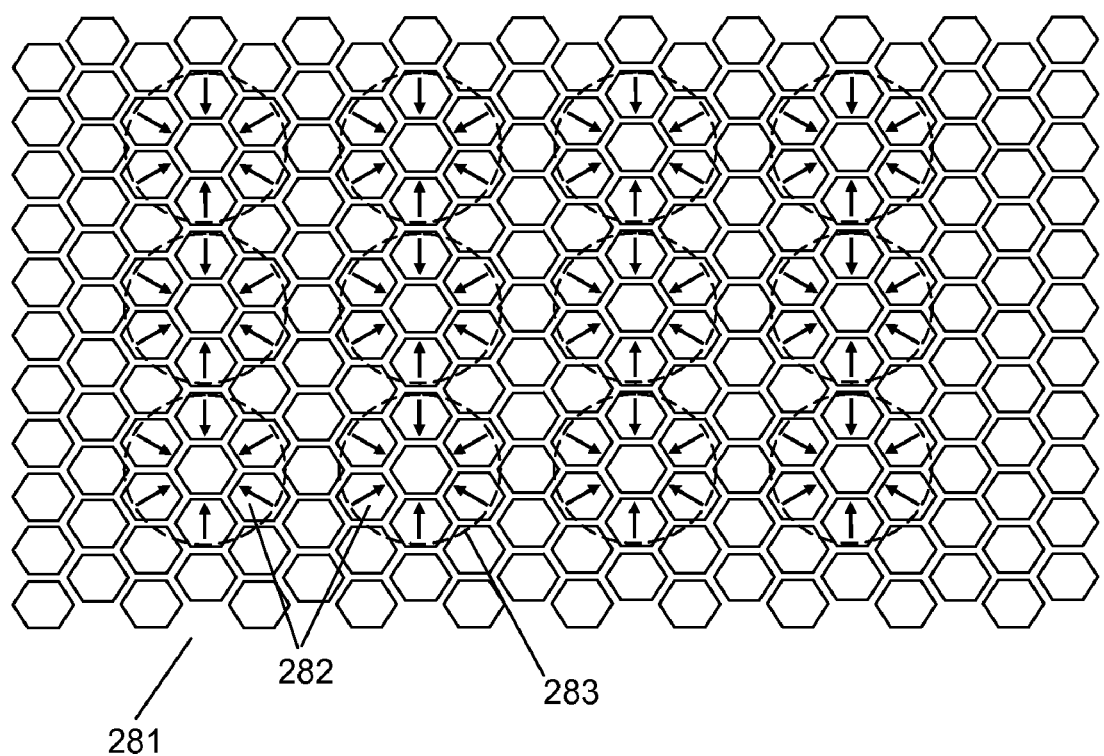
FIG. 28 shows schematic illustration of a Micromirror Array Lens comprising a plurality of micromirrors forming a plurality of optical surface profiles with circular shape apertures at one time.

FIG. 28 shows schematic illustration of a Micromirror Array Lens 281 comprising a plurality of micromirrors 282 forming a plurality of optical surface profiles 283 with circular shape apertures at one time. The size, position, and optical surface profile of lenses 283 formed in a single Micromirror Array Lens 281 at one time can be varied according to the required specification.

While the invention has been shown and described with reference to different embodiments thereof, it will be appreciated by those skills in the art that variations in form, detail, compositions and operation may be made without departing from the spirit and scope of the invention as defined by the accompanying claims.

What is claimed is:

1. A Micromirror Array Lens comprising a plurality of micromirrors, wherein each of the micromirrors has a reflective surface and is configured to have at least one motion to form at least one optical surface profile, wherein each optical surface profile satisfies a same phase condition and a converging condition.

2. The Micromirror Array Lens of claim 1, wherein each optical surface profile reproduces an optical lens with predetermined optical properties.

3. The Micromirror Array Lens of claim 2, wherein the optical surface profile is determined by rotation and translation of the micromirrors in the Micromirror Array Lens.

4. The Micromirror Array Lens of claim 2, wherein the optical property is a focal length of the Micromirror Array Lens.

5. The Micromirror Array Lens of claim 2, wherein the optical property is an optical axis of the Micromirror Array Lens.

6. The Micromirror Array Lens of claim 2, wherein the optical property is a field of view of the Micromirror Array Lens.

7. The Micromirror Array Lens of claim 2, wherein the optical property is an aberration correction of the Micromirror Array Lens.

8. The Micromirror Array Lens of claim 2, wherein the optical property is an optical power of the Micromirror Array Lens.

9. The Micromirror Array Lens of claim 2, wherein the optical property is an optical magnification of the Micromirror Array Lens.

10. The Micromirror Array Lens of claim 2, wherein the optical property is an optical aperture of the Micromirror Array Lens.

11. The Micromirror Array Lens of claim 1, wherein the Micromirror Array Lens has a plurality of optical surface profiles.

12. The Micromirror Array Lens of claim 11, wherein the Micromirror Array Lens is configured to have variable optical properties by changing the optical surface profile of the Micromirror Array Lane by controlling the micromirrors.

13. The Micromirror Array Lens of claim 12, wherein the Micromirror Array Lens is configured to have a variable focal length, wherein the focal length of the Micromirror Array Lens is varied by changing the optical surface profile of the Micromirror Array Lens by controlling the micromirrors.

14. The Micromirror Array Lens of claim 12, wherein the Micromirror Array Lens is configured to have a variable optical axis, wherein the optical axis of the Micromirror Array Lens is varied by changing the optical surface profile of the Micromirror Array Lens by controlling the micromirrors.

15. The Micromirror Array Lens of claim 12, wherein the Micromirror Array Lens is configured to have a variable aperture size, wherein the aperture size of the Micromirror Array Lens is varied by changing the optical surface profile of the Micromirror Array Lens by controlling the micromirrors.

16. The Micromirror Array Lens of claim 12, wherein the Micromirror Array Lens is configured to have a variable field of view, wherein the field of view of the Micromirror Array Lens is varied by changing the optical surface profile of the Micromirror Array Lens by controlling the micromirrors.

17. The Micromirror Array Lens of claim 12, wherein the Micromirror Array Lens is configured to have a variable aberration correction, wherein the aberration correction of the Micromirror Array Lens is varied by changing the optical surface profile of the Micromirror Array Lens by controlling the micromirrors.

18. The Micromirror Array Lens of claim 12, wherein the Micromirror Array Lens is configured to have a variable optical power, wherein the optical power of the Micromirror Array Lens is varied by changing the optical surface profile of the Micromirror Array Lens by controlling the micromirrors.

19. The Micromirror Array Lens of claim 12, wherein the Micromirror Array Lens is configured to have a variable optical magnification, wherein the optical magnification of the Micromirror Array Lens is varied by changing the optical surface profile of the Micromirror Array Lens by controlling the micromirrors.

20. The Micromirror Array Lens of claim 1, wherein the optical surface profile is formed to reproduce a free surface having its characteristic optical property selected from the group of focal length, optical axis, field of view, aberration correction, optical power, optical magnification, and aperture size of the Micromirror Array Lens.

21. The Micromirror Array Lane of claim 20, wherein the Micromirror Array Lens is configured to provide an adjustable aperture having a plurality of aperture sizes by controlling micromirrors, wherein the adjustable aperture controls the amount of incident light admitted to an image sensor by changing the aperture size.

22. The Micromirror Array Lens of claim 20, wherein the Micromirror Array Lens is configured to focus light and steer the focused light across an area of interest by changing the optical surface profiles of the Micromirror Array Lens.

23. The Micromirror Array Lens of claim 20, wherein the Micromirror Array Lens is configured to have optical shutter function wherein at least one of the optical surface profile of the Micromirror Array Lens makes incident light redirected out of an image sensor when the optical shutter function is on.

24. The Micromirror Array Lens of claim 20, wherein the Micromirror Array Lens is configured to control amount of incident light admitted to an image sensor by adjusting the aperture size of the Micromirror Array Lens.

25. The Micromirror Array Lens of claim 1, wherein the Micromirror Array Lens comprises a control circuitry configured to control the micromirrors, wherein the control circuitry is constructed under the micromirrors by using microelectronics fabrication technologies.

26. The Micromirror Array Lens of claim 25, wherein the micromirrors in the Micromirror Array Lens are controlled by a common input signal to the control circuitry to form an optical surface profile and change the optical surface profile of the Micromirror Array Lens.

27. The Micromirror Array Lens of claim 26, wherein the optical surface profile of the Micromirror Array Lens is changed discretely by controlling the micromirrors in the Micromirror Array Lens with discrete motions.

28. The Micromirror Array Lens of claim 1, wherein the optical surface profile reproduces a portion of surface of revolution of a conic section.

29. The Micromirror Array Lens of claim 1, wherein the optical surface profile reproduces an aspheric surface.

30. The Micromirror Array Lens of claim 1, wherein the optical surface profile reproduces an anamorphic surface.

31. The Micromirror Array Lens of claim 1, wherein the optical surface profile reproduces a free surface.

32. The Micromirror Array Lens of claim 1, wherein the optical surface profile reproduce a Fresnel type reflective surface.

33. The Micromirror Array Lens of claim 1, wherein the optical surface profile reproduces a diffractive optical element surface.

34. The Micromirror Array Lens of claim 1, wherein the micromirrors in the Micromirror Array Lens is arranged in a flat surface.

35. The Micromirror Array Lens of claim 1, wherein the micromirrors in the Micromirror Array Lens is arranged in a surface with a predetermined curvature.

36. The Micromirror Array Lens of claim 1, wherein the micromirrors in the Micromirror Array Lens have a substantially flat surface.

37. The Micromirror Array Lens of claim 1, wherein the micromirrors in the Micromirror Array Lens have a surface with a predetermined curvature.

38. The Micromirror Array Lens of claim 1, wherein the micromirrors in the Micromirror Array Lens have a curved surface with a variable curvature.

39. The Micromirror Array Lens of claim 1, wherein the micromirrors in the Micromirror Array Lens have a shape selected from the group consisting of a fan shape, a hexagonal shape, a rectangular shape, a square shape, a triangle shape and a circular shape.

40. The Micromirror Array Lens of claim 1, wherein the reflective surface of the micromirrors is made of the material selected from the group consisting of metal, metal coated with multi-layer dielectric material, metal coated with anti-oxidant, and multi-layer dielectric material.

41. The Micromirror Array Lens of claim 40, wherein the metal of the reflective surface is made of material selected from the group consisting of silver (Ag), aluminum (Al), gold (Au), nickel (Ni.), chromium (Cr), and platinum (Pt) to have high reflectivity.

42. The Micromirror Array Lens of claim 40, wherein the metal of the reflective surface is protected by a coating layer deposited on the reflective surface with material selected from the group consisting of silicon oxide ($SiO_2$), aluminum oxide ($Al_2O_3$), magnesium oxide (MgO), titanium oxide ($TiO_2$), cesium oxide ($CeO_2$), silicon nitride ($Si_3N_4$), titanium nitride (TiN), magnesium fluoride ($MgF_2$), zinc sulfide (ZnS), zinc selenide (ZnSe), polycarbonate, polyester, polyethylene naphthalate, and fluoropolymer.

43. The Micromirror Array Lens of claim 1, wherein the micromirrors in the Micromirror Array Lens comprise actuating components and mechanical structures configured to make the micromirrors have multiple degrees of freedom motion.

44. The Micromirror Array Lens of claim 43, wherein the actuating components are actuated by electrostatic force.

45. The Micromirror Array Lens of claim 43, wherein the actuating components are actuated by electromagnetic force.

46. The Micromirror Array Lens of claim 1, wherein each micromirror in the Micromirror Array Lens is configured to have an independent motion.

47. The Micromirror Array Lens of claim 1, wherein each micromirror in the Micromirror Array Lens is individually controlled to form an optical surface profile.

48. A Micromirror Array Lens comprising a plurality of micromirrors, wherein each of the micromirrors has a reflective surface and is configured to have a plurality of motions, wherein the Micromirror Array Lens is configured to form a plurality of optical surface profiles and harm at least one variable optical property, wherein the optical property can be a focal length, an optical axis, an aberration correction, an optical power, a field of view, an optical magnification, and an aperture size of the Micromirror Array Lens.

49. A Micromirror Array Lens comprising a plurality of micromirrors, wherein each of the micromirrors has a reflective surface, wherein the Micromirror Array Lens is configured to form an optical surface profile reproducing an arbitrary free surface, wherein the arbitrary free surface includes a spherical free surface, an aspherical free surface, a portion of surface of revolution of a conic section, a revolution symmetric free surface, a line symmetric free surface, an anamorphic surface, a continuous free surface, a discrete free surface, a Fresnel type reflective surface, and a diffractive optical element surface.

* * * * *